(12) United States Patent
Campbell et al.

(10) Patent No.: US 9,001,456 B2
(45) Date of Patent: Apr. 7, 2015

(54) ENGAGING TEST SLOTS

(75) Inventors: Philip Campbell, Bedford, NH (US); Joseph F. Wrinn, Winchester, MA (US)

(73) Assignee: Teradyne, Inc., North Reading, MA (US)

( * ) Notice: Subject to any disclaimer, the term of this patent is extended or adjusted under 35 U.S.C. 154(b) by 401 days.

(21) Appl. No.: 12/872,401

(22) Filed: Aug. 31, 2010

(65) Prior Publication Data

US 2012/0050903 A1  Mar. 1, 2012

(51) Int. Cl.
*G11B 15/68* (2006.01)
*G11B 33/12* (2006.01)

(52) U.S. Cl.
CPC .................... *G11B 33/128* (2013.01)

(58) Field of Classification Search
None
See application file for complete search history.

(56) References Cited

U.S. PATENT DOCUMENTS

| | | |
|---|---|---|
| 557,186 A | 3/1896 | Cahill |
| 2,224,407 A | 12/1940 | Passur |
| 2,380,026 A | 7/1945 | Clarke |
| 2,631,775 A | 3/1953 | Gordon |
| 2,635,524 A | 4/1953 | Jenkins |
| 3,120,166 A | 2/1964 | Lyman |
| 3,360,032 A | 12/1967 | Sherwood |
| 3,364,838 A | 1/1968 | Bradley |
| 3,517,601 A | 6/1970 | Courchesne |
| 3,845,286 A | 10/1974 | Aronstein et al. |
| 4,147,299 A | 4/1979 | Freeman |
| 4,233,644 A | 11/1980 | Hwang et al. |
| 4,336,748 A | 6/1982 | Martin et al. |
| 4,379,259 A | 4/1983 | Varadi et al. |
| 4,477,127 A | 10/1984 | Kume |
| 4,495,545 A | 1/1985 | Dufresne et al. |
| 4,526,318 A | 7/1985 | Fleming et al. |
| 4,620,248 A | 10/1986 | Gitzendanner |
| 4,648,007 A | 3/1987 | Garner |
| 4,654,732 A | 3/1987 | Mesher |
| 4,665,455 A | 5/1987 | Mesher |
| 4,683,424 A | 7/1987 | Cutright et al. |
| 4,685,303 A | 8/1987 | Branc et al. |
| 4,688,124 A | 8/1987 | Scribner et al. |
| 4,713,714 A | 12/1987 | Gatti et al. |
| 4,739,444 A | 4/1988 | Zushi et al. |
| 4,754,397 A | 6/1988 | Varaiya et al. |
| 4,768,285 A | 9/1988 | Woodman, Jr. |
| 4,778,063 A | 10/1988 | Ueberreiter |

(Continued)

FOREIGN PATENT DOCUMENTS

| | | |
|---|---|---|
| AU | 583716 | 5/1989 |
| CN | 1177187 | 3/1998 |

(Continued)

OTHER PUBLICATIONS

International Search Report and Written Opinion of International Application No. PCT/US2011/046919, dated Feb. 24, 2012.

(Continued)

*Primary Examiner* — Andrew L Sniezek
(74) *Attorney, Agent, or Firm* — Fish & Richardson P.C.

(57) ABSTRACT

In general, a test slot is engaged with automated machinery to inhibit movement of the test slot, thereby inhibiting transmission of vibration from the test slot to its surroundings. While the automated machinery is engaged with the test slot, the automated machinery is actuated to insert a storage device into the test slot, or remove the storage device from the test slot.

18 Claims, 16 Drawing Sheets

(56) References Cited

U.S. PATENT DOCUMENTS

| | | |
|---|---|---|
| 4,801,234 A | 1/1989 | Cedrone |
| 4,809,881 A | 3/1989 | Becker |
| 4,817,273 A | 4/1989 | Lape et al. |
| 4,817,934 A | 4/1989 | McCormick et al. |
| 4,851,965 A | 7/1989 | Gabuzda et al. |
| 4,881,591 A | 11/1989 | Rignall |
| 4,888,549 A | 12/1989 | Wilson et al. |
| 4,911,281 A | 3/1990 | Jenkner |
| 4,967,155 A | 10/1990 | Magnuson |
| 5,012,187 A | 4/1991 | Littlebury |
| 5,045,960 A | 9/1991 | Eding |
| 5,061,630 A | 10/1991 | Knopf et al. |
| 5,119,270 A | 6/1992 | Bolton et al. |
| 5,122,914 A | 6/1992 | Hanson |
| 5,127,684 A | 7/1992 | Klotz et al. |
| 5,128,813 A | 7/1992 | Lee |
| 5,136,395 A | 8/1992 | Ishii et al. |
| 5,158,132 A | 10/1992 | Guillemot |
| 5,168,424 A | 12/1992 | Bolton et al. |
| 5,171,183 A | 12/1992 | Pollard et al. |
| 5,173,819 A | 12/1992 | Takahashi et al. |
| 5,176,202 A | 1/1993 | Richard |
| 5,205,132 A | 4/1993 | Fu |
| 5,206,772 A | 4/1993 | Hirano et al. |
| 5,207,613 A | 5/1993 | Ferchau et al. |
| 5,210,680 A | 5/1993 | Scheibler |
| 5,237,484 A | 8/1993 | Ferchau et al. |
| 5,263,537 A | 11/1993 | Plucinski et al. |
| 5,269,698 A | 12/1993 | Singer |
| 5,295,392 A | 3/1994 | Hensel et al. |
| 5,309,323 A | 5/1994 | Gray et al. |
| 5,325,263 A | 6/1994 | Singer et al. |
| 5,349,486 A | 9/1994 | Sugimoto et al. |
| 5,368,072 A | 11/1994 | Cote |
| 5,374,395 A | 12/1994 | Robinson et al. |
| 5,379,229 A | 1/1995 | Parsons et al. |
| 5,398,058 A | 3/1995 | Hattori |
| 5,412,534 A | 5/1995 | Cutts et al. |
| 5,414,591 A | 5/1995 | Kimura et al. |
| 5,426,581 A | 6/1995 | Kishi et al. |
| 5,469,037 A | 11/1995 | McMurtrey, Sr. et al. |
| 5,477,416 A | 12/1995 | Schkrohowsky et al. |
| 5,484,012 A | 1/1996 | Hiratsuka |
| 5,486,681 A | 1/1996 | Dagnac et al. |
| 5,487,579 A * | 1/1996 | Woodruff .................... 294/115 |
| 5,491,610 A | 2/1996 | Mok et al. |
| 5,543,727 A | 8/1996 | Bushard et al. |
| 5,546,250 A | 8/1996 | Diel |
| 5,557,186 A | 9/1996 | McMurtrey, Sr. et al. |
| 5,563,768 A | 10/1996 | Perdue |
| 5,570,740 A | 11/1996 | Flores et al. |
| 5,593,380 A | 1/1997 | Bittikofer |
| 5,601,141 A | 2/1997 | Gordon et al. |
| 5,604,662 A | 2/1997 | Anderson et al. |
| 5,610,893 A | 3/1997 | Soga et al. |
| 5,617,430 A | 4/1997 | Angelotti et al. |
| 5,644,705 A | 7/1997 | Stanley |
| 5,646,918 A | 7/1997 | Dimitri et al. |
| 5,654,846 A | 8/1997 | Wicks et al. |
| 5,673,029 A | 9/1997 | Behl et al. |
| 5,694,290 A | 12/1997 | Chang |
| 5,718,627 A | 2/1998 | Wicks |
| 5,718,628 A | 2/1998 | Nakazato et al. |
| 5,731,928 A | 3/1998 | Jabbari et al. |
| 5,751,549 A | 5/1998 | Eberhardt et al. |
| 5,754,365 A | 5/1998 | Beck et al. |
| 5,761,032 A | 6/1998 | Jones |
| 5,764,615 A | 6/1998 | Ware et al. |
| 5,793,610 A | 8/1998 | Schmitt et al. |
| 5,811,678 A | 9/1998 | Hirano |
| 5,812,761 A | 9/1998 | Seki et al. |
| 5,819,842 A | 10/1998 | Potter et al. |
| 5,831,525 A | 11/1998 | Harvey |
| 5,851,143 A | 12/1998 | Hamid |
| 5,859,409 A | 1/1999 | Kim et al. |
| 5,859,540 A | 1/1999 | Fukumoto |
| 5,862,037 A | 1/1999 | Behl |
| 5,870,630 A | 2/1999 | Reasoner et al. |
| 5,886,639 A | 3/1999 | Behl et al. |
| 5,890,959 A | 4/1999 | Pettit et al. |
| 5,912,799 A | 6/1999 | Grouell et al. |
| 5,913,926 A | 6/1999 | Anderson et al. |
| 5,914,856 A | 6/1999 | Morton et al. |
| 5,927,386 A | 7/1999 | Lin |
| 5,956,301 A | 9/1999 | Dimitri et al. |
| 5,959,834 A | 9/1999 | Chang |
| 5,999,356 A | 12/1999 | Dimitri et al. |
| 5,999,365 A | 12/1999 | Hasegawa et al. |
| 6,000,623 A | 12/1999 | Blatti et al. |
| 6,005,404 A | 12/1999 | Cochran et al. |
| 6,005,770 A | 12/1999 | Schmitt |
| 6,008,636 A | 12/1999 | Miller et al. |
| 6,008,984 A | 12/1999 | Cunningham et al. |
| 6,011,689 A | 1/2000 | Wrycraft |
| 6,031,717 A | 2/2000 | Baddour et al. |
| 6,034,870 A | 3/2000 | Osborn et al. |
| 6,042,348 A | 3/2000 | Aakalu et al. |
| 6,045,113 A | 4/2000 | Itakura |
| 6,055,814 A | 5/2000 | Song |
| 6,066,822 A | 5/2000 | Nemoto et al. |
| 6,067,225 A | 5/2000 | Reznikov et al. |
| 6,069,792 A | 5/2000 | Nelik |
| 6,084,768 A | 7/2000 | Bolognia |
| 6,094,342 A | 7/2000 | Dague et al. |
| 6,104,607 A | 8/2000 | Behl |
| 6,115,250 A | 9/2000 | Schmitt |
| 6,122,131 A | 9/2000 | Jeppson |
| 6,122,232 A | 9/2000 | Schell et al. |
| 6,124,707 A | 9/2000 | Kim et al. |
| 6,130,817 A | 10/2000 | Flotho et al. |
| 6,144,553 A | 11/2000 | Hileman et al. |
| 6,153,999 A | 11/2000 | Borrego |
| 6,166,901 A | 12/2000 | Gamble et al. |
| 6,169,413 B1 | 1/2001 | Pack et al. |
| 6,169,930 B1 | 1/2001 | Blachek et al. |
| 6,177,805 B1 | 1/2001 | Pih |
| 6,178,835 B1 | 1/2001 | Orriss et al. |
| 6,181,557 B1 | 1/2001 | Gatti |
| 6,185,065 B1 | 2/2001 | Hasegawa et al. |
| 6,185,097 B1 | 2/2001 | Behl |
| 6,188,191 B1 | 2/2001 | Frees et al. |
| 6,192,282 B1 | 2/2001 | Smith et al. |
| 6,193,339 B1 | 2/2001 | Behl et al. |
| 6,209,842 B1 | 4/2001 | Anderson et al. |
| 6,227,516 B1 | 5/2001 | Webster, Jr. et al. |
| 6,229,275 B1 | 5/2001 | Yamamoto |
| 6,231,145 B1 | 5/2001 | Liu |
| 6,233,148 B1 | 5/2001 | Shen |
| 6,236,563 B1 | 5/2001 | Buican et al. |
| 6,247,944 B1 | 6/2001 | Bolognia et al. |
| 6,249,824 B1 | 6/2001 | Henrichs |
| 6,252,769 B1 | 6/2001 | Tullstedt et al. |
| 6,262,863 B1 | 7/2001 | Ostwald et al. |
| 6,272,007 B1 | 8/2001 | Kitlas et al. |
| 6,272,767 B1 | 8/2001 | Botruff et al. |
| 6,281,677 B1 | 8/2001 | Cosci et al. |
| 6,282,501 B1 | 8/2001 | Assouad |
| 6,285,524 B1 | 9/2001 | Boigenzahn et al. |
| 6,289,678 B1 | 9/2001 | Pandolfi |
| 6,297,950 B1 | 10/2001 | Erwin |
| 6,298,672 B1 | 10/2001 | Valicoff, Jr. |
| 6,302,714 B1 | 10/2001 | Bolognia et al. |
| 6,304,839 B1 | 10/2001 | Ho et al. |
| 6,307,386 B1 | 10/2001 | Fowler et al. |
| 6,327,150 B1 | 12/2001 | Levy et al. |
| 6,330,154 B1 | 12/2001 | Fryers et al. |
| 6,351,379 B1 | 2/2002 | Cheng |
| 6,354,792 B1 | 3/2002 | Kobayashi et al. |
| 6,356,409 B1 | 3/2002 | Price et al. |
| 6,356,415 B1 | 3/2002 | Kabasawa |
| 6,384,995 B1 | 5/2002 | Smith |
| 6,388,437 B1 | 5/2002 | Wolski et al. |
| 6,388,875 B1 | 5/2002 | Chen |
| 6,388,878 B1 | 5/2002 | Chang |

(56) References Cited

U.S. PATENT DOCUMENTS

| | | |
|---|---|---|
| 6,389,225 B1 | 5/2002 | Malinoski et al. |
| 6,411,584 B2 | 6/2002 | Davis et al. |
| 6,421,236 B1 | 7/2002 | Montoya et al. |
| 6,434,000 B1 | 8/2002 | Pandolfi |
| 6,434,498 B1 | 8/2002 | Ulrich et al. |
| 6,434,499 B1 | 8/2002 | Ulrich et al. |
| 6,464,080 B1 | 10/2002 | Morris et al. |
| 6,467,153 B2 | 10/2002 | Butts et al. |
| 6,473,297 B1 | 10/2002 | Behl et al. |
| 6,473,301 B1 | 10/2002 | Levy et al. |
| 6,476,627 B1 | 11/2002 | Pelissier et al. |
| 6,477,044 B2 | 11/2002 | Foley et al. |
| 6,477,442 B1 | 11/2002 | Valerino, Sr. |
| 6,480,380 B1 | 11/2002 | French et al. |
| 6,480,382 B2 | 11/2002 | Cheng |
| 6,487,071 B1 | 11/2002 | Tata et al. |
| 6,489,793 B2 | 12/2002 | Jones et al. |
| 6,494,663 B2 | 12/2002 | Ostwald et al. |
| 6,525,933 B2 | 2/2003 | Eland |
| 6,526,841 B1 | 3/2003 | Wanek et al. |
| 6,535,384 B2 | 3/2003 | Huang |
| 6,537,013 B2 | 3/2003 | Emberty et al. |
| 6,544,309 B1 | 4/2003 | Hoefer et al. |
| 6,546,445 B1 | 4/2003 | Hayes |
| 6,553,532 B1 | 4/2003 | Aoki |
| 6,560,107 B1 | 5/2003 | Beck et al. |
| 6,565,163 B2 | 5/2003 | Behl et al. |
| 6,566,859 B2 | 5/2003 | Wolski et al. |
| 6,567,266 B2 | 5/2003 | Ives et al. |
| 6,570,734 B2 | 5/2003 | Ostwald et al. |
| 6,577,586 B1 | 6/2003 | Yang et al. |
| 6,577,687 B2 | 6/2003 | Hall et al. |
| 6,618,254 B2 | 9/2003 | Ives |
| 6,626,846 B2 | 9/2003 | Spencer |
| 6,628,518 B2 | 9/2003 | Behl et al. |
| 6,635,115 B1 | 10/2003 | Fairbairn et al. |
| 6,640,235 B1 | 10/2003 | Anderson |
| 6,644,982 B1 | 11/2003 | Ondricek et al. |
| 6,651,192 B1 | 11/2003 | Viglione et al. |
| 6,654,240 B1 | 11/2003 | Tseng et al. |
| 6,669,431 B2 | 12/2003 | Falace et al. |
| 6,679,128 B2 | 1/2004 | Wanek et al. |
| 6,693,757 B2 | 2/2004 | Hayakawa et al. |
| 6,741,529 B1 | 5/2004 | Getreuer |
| 6,746,648 B1 | 6/2004 | Mattila et al. |
| 6,751,093 B1 | 6/2004 | Hsu et al. |
| 6,791,785 B1 | 9/2004 | Messenger et al. |
| 6,791,799 B2 | 9/2004 | Fletcher |
| 6,798,651 B2 | 9/2004 | Syring et al. |
| 6,798,972 B1 | 9/2004 | Ito et al. |
| 6,801,834 B1 | 10/2004 | Konshak et al. |
| 6,806,700 B2 | 10/2004 | Wanek et al. |
| 6,811,427 B2 | 11/2004 | Garrett et al. |
| 6,826,046 B1 | 11/2004 | Muncaster et al. |
| 6,830,372 B2 | 12/2004 | Liu et al. |
| 6,832,929 B2 | 12/2004 | Garrett et al. |
| 6,861,861 B2 | 3/2005 | Song et al. |
| 6,862,173 B1 | 3/2005 | Konshak et al. |
| 6,867,939 B2 | 3/2005 | Katahara et al. |
| 6,892,328 B2 | 5/2005 | Klein et al. |
| 6,904,479 B2 | 6/2005 | Hall et al. |
| 6,908,330 B2 | 6/2005 | Garrett et al. |
| 6,928,336 B2 | 8/2005 | Peshkin et al. |
| 6,937,432 B2 | 8/2005 | Sri-Jayantha et al. |
| 6,957,291 B2 | 10/2005 | Moon et al. |
| 6,965,811 B2 | 11/2005 | Dickey et al. |
| 6,974,017 B2 | 12/2005 | Oseguera |
| 6,976,190 B1 | 12/2005 | Goldstone |
| 6,980,381 B2 | 12/2005 | Gray et al. |
| 6,982,872 B2 | 1/2006 | Behl et al. |
| 7,006,325 B2 | 2/2006 | Emberty et al. |
| 7,039,924 B2 | 5/2006 | Goodman et al. |
| 7,054,150 B2 | 5/2006 | Orriss et al. |
| 7,070,323 B2 | 7/2006 | Wanek et al. |
| 7,076,391 B1 | 7/2006 | Pakzad et al. |
| 7,077,614 B1 | 7/2006 | Hasper et al. |
| 7,088,541 B2 | 8/2006 | Orriss et al. |
| 7,092,251 B1 | 8/2006 | Henry |
| 7,106,582 B2 | 9/2006 | Albrecht et al. |
| 7,123,477 B2 | 10/2006 | Coglitore et al. |
| 7,126,777 B2 | 10/2006 | Flechsig et al. |
| 7,130,138 B2 | 10/2006 | Lum et al. |
| 7,134,553 B2 | 11/2006 | Stephens |
| 7,139,145 B1 | 11/2006 | Archibald et al. |
| 7,164,579 B2 | 1/2007 | Muncaster et al. |
| 7,167,360 B2 | 1/2007 | Inoue et al. |
| 7,181,458 B1 | 2/2007 | Higashi |
| 7,203,021 B1 | 4/2007 | Ryan et al. |
| 7,203,060 B2 | 4/2007 | Kay et al. |
| 7,206,201 B2 | 4/2007 | Behl et al. |
| 7,216,968 B2 | 5/2007 | Smith et al. |
| 7,219,028 B2 | 5/2007 | Bae et al. |
| 7,219,273 B2 | 5/2007 | Fisher et al. |
| 7,227,746 B2 | 6/2007 | Tanaka et al. |
| 7,232,101 B2 | 6/2007 | Wanek et al. |
| 7,243,043 B2 | 7/2007 | Shin |
| 7,248,467 B2 | 7/2007 | Sri-Jayantha et al. |
| 7,259,966 B2 | 8/2007 | Connelly, Jr. et al. |
| 7,273,344 B2 | 9/2007 | Ostwald et al. |
| 7,280,353 B2 | 10/2007 | Wendel et al. |
| 7,289,885 B2 | 10/2007 | Basham et al. |
| 7,304,855 B1 | 12/2007 | Milligan et al. |
| 7,315,447 B2 | 1/2008 | Inoue et al. |
| 7,349,205 B2 | 3/2008 | Hall et al. |
| 7,353,524 B1 | 4/2008 | Lin et al. |
| 7,385,385 B2 | 6/2008 | Magliocco et al. |
| 7,395,133 B2 | 7/2008 | Lowe |
| 7,403,451 B2 | 7/2008 | Goodman et al. |
| 7,421,623 B2 | 9/2008 | Haugh ............................ 714/47 |
| 7,437,212 B2 | 10/2008 | Farchmin et al. |
| 7,447,011 B2 | 11/2008 | Wade et al. |
| 7,457,112 B2 | 11/2008 | Fukuda et al. |
| 7,467,024 B2 | 12/2008 | Flitsch |
| 7,476,362 B2 | 1/2009 | Angros |
| 7,483,269 B1 | 1/2009 | Marvin, Jr. et al. |
| 7,505,264 B2 | 3/2009 | Hall et al. |
| 7,554,811 B2 | 6/2009 | Scicluna et al. |
| 7,568,122 B2 | 7/2009 | Mechalke et al. |
| 7,570,455 B2 | 8/2009 | Deguchi et al. |
| 7,573,715 B2 | 8/2009 | Mojaver et al. |
| 7,584,851 B2 | 9/2009 | Hong et al. |
| 7,612,996 B2 | 11/2009 | Atkins et al. |
| 7,625,027 B2 | 12/2009 | Kiaie et al. |
| 7,630,196 B2 | 12/2009 | Hall et al. |
| 7,643,289 B2 | 1/2010 | Ye et al. |
| 7,646,596 B2 | 1/2010 | Ng |
| 7,729,107 B2 | 6/2010 | Atkins et al. |
| 2001/0006453 A1 | 7/2001 | Glorioso et al. |
| 2001/0044023 A1 | 11/2001 | Johnson et al. |
| 2001/0046118 A1 | 11/2001 | Yamanashi et al. |
| 2001/0048590 A1 | 12/2001 | Behl et al. |
| 2002/0030981 A1 | 3/2002 | Sullivan et al. |
| 2002/0044416 A1 | 4/2002 | Harmon, III et al. |
| 2002/0051338 A1 | 5/2002 | Jiang et al. |
| 2002/0071248 A1 | 6/2002 | Huang et al. |
| 2002/0079422 A1 | 6/2002 | Jiang |
| 2002/0090320 A1 | 7/2002 | Burow et al. |
| 2002/0116087 A1 | 8/2002 | Brown |
| 2002/0161971 A1 | 10/2002 | Dimitri et al. |
| 2002/0172004 A1 | 11/2002 | Ives et al. |
| 2003/0035271 A1 | 2/2003 | Lelong et al. |
| 2003/0043550 A1 | 3/2003 | Ives |
| 2003/0155460 A1 | 8/2003 | Hiraguchi |
| 2003/0206397 A1 | 11/2003 | Allgeyer et al. |
| 2004/0165489 A1* | 8/2004 | Goodman et al. ......... 369/30.42 |
| 2004/0230399 A1 | 11/2004 | Shin |
| 2004/0236465 A1 | 11/2004 | Butka et al. |
| 2004/0264121 A1 | 12/2004 | Orriss et al. |
| 2005/0004703 A1 | 1/2005 | Christie |
| 2005/0010836 A1 | 1/2005 | Bae et al. |
| 2005/0018397 A1 | 1/2005 | Kay et al. |
| 2005/0055601 A1 | 3/2005 | Wilson et al. |
| 2005/0057849 A1 | 3/2005 | Twogood et al. |
| 2005/0069400 A1 | 3/2005 | Dickey et al. |

(56) References Cited

U.S. PATENT DOCUMENTS

| | | |
|---|---|---|
| 2005/0109131 A1 | 5/2005 | Wanek et al. |
| 2005/0116702 A1 | 6/2005 | Wanek et al. |
| 2005/0131578 A1 | 6/2005 | Weaver |
| 2005/0179457 A1 | 8/2005 | Min et al. |
| 2005/0185323 A1* | 8/2005 | Brace et al. ............ 360/92 |
| 2005/0207059 A1 | 9/2005 | Cochrane |
| 2005/0219809 A1 | 10/2005 | Muncaster et al. |
| 2005/0225338 A1 | 10/2005 | Sands et al. |
| 2005/0270737 A1 | 12/2005 | Wilson et al. |
| 2006/0010353 A1 | 1/2006 | Haugh ................ 714/47 |
| 2006/0023331 A1 | 2/2006 | Flechsig et al. |
| 2006/0028802 A1 | 2/2006 | Shaw et al. |
| 2006/0066974 A1 | 3/2006 | Akamatsu et al. |
| 2006/0130316 A1 | 6/2006 | Takase et al. |
| 2006/0190205 A1 | 8/2006 | Klein et al. |
| 2006/0227517 A1 | 10/2006 | Zayas et al. |
| 2006/0250766 A1 | 11/2006 | Blaalid et al. |
| 2006/0269384 A1 | 11/2006 | Kiaie et al. |
| 2007/0034368 A1 | 2/2007 | Atkins et al. |
| 2007/0035874 A1 | 2/2007 | Wendel et al. |
| 2007/0035875 A1 | 2/2007 | Hall et al. |
| 2007/0053154 A1 | 3/2007 | Fukuda et al. |
| 2007/0082907 A1 | 4/2007 | Canada et al. |
| 2007/0127202 A1 | 6/2007 | Scicluna et al. |
| 2007/0127206 A1 | 6/2007 | Wade et al. |
| 2007/0195497 A1 | 8/2007 | Atkins |
| 2007/0248142 A1 | 10/2007 | Roundtree et al. |
| 2007/0253157 A1 | 11/2007 | Atkins et al. |
| 2007/0286045 A1 | 12/2007 | Onagi et al. |
| 2008/0007865 A1 | 1/2008 | Orriss et al. |
| 2008/0030945 A1 | 2/2008 | Mojaver et al. |
| 2008/0112075 A1 | 5/2008 | Farquhar et al. |
| 2008/0239564 A1 | 10/2008 | Farquhar et al. |
| 2008/0282275 A1 | 11/2008 | Zaczek et al. |
| 2008/0282278 A1 | 11/2008 | Barkley |
| 2009/0028669 A1 | 1/2009 | Rebstock |
| 2009/0082907 A1 | 3/2009 | Stuvel et al. |
| 2009/0122443 A1 | 5/2009 | Farquhar et al. |
| 2009/0142169 A1 | 6/2009 | Garcia et al. |
| 2009/0153992 A1 | 6/2009 | Garcia et al. |
| 2009/0153993 A1 | 6/2009 | Garcia et al. |
| 2009/0153994 A1 | 6/2009 | Merrow |
| 2009/0175705 A1 | 7/2009 | Nakao et al. |
| 2009/0261047 A1 | 10/2009 | Merrow |
| 2009/0261228 A1 | 10/2009 | Merrow |
| 2009/0261229 A1 | 10/2009 | Merrow |
| 2009/0262444 A1 | 10/2009 | Polyakov et al. |
| 2009/0262445 A1 | 10/2009 | Noble et al. |
| 2009/0262454 A1 | 10/2009 | Merrow |
| 2009/0262455 A1 | 10/2009 | Merrow |
| 2009/0265032 A1 | 10/2009 | Toscano et al. |
| 2009/0265043 A1 | 10/2009 | Merrow |
| 2009/0265136 A1 | 10/2009 | Garcia et al. |
| 2009/0297328 A1 | 12/2009 | Slocum, III |
| 2010/0195236 A1 | 8/2010 | Merrow et al. |

FOREIGN PATENT DOCUMENTS

| | | |
|---|---|---|
| CN | 2341188 | 9/1999 |
| CN | 1114109 | 7/2003 |
| CN | 1192544 | 3/2005 |
| DE | 3786944 | 11/1993 |
| DE | 69111634 | 5/1996 |
| DE | 69400145 | 10/1996 |
| DE | 19701548 | 8/1997 |
| DE | 19804813 | 9/1998 |
| DE | 69614460 | 6/2002 |
| DE | 69626584 | 12/2003 |
| DE | 19861388 | 8/2007 |
| EP | 0210497 | 7/1986 |
| EP | 0242970 | 10/1987 |
| EP | 0 277 634 A | 8/1988 |
| EP | 0356977 | 8/1989 |
| EP | 0442642 | 2/1991 |
| EP | 0466073 | 7/1991 |
| EP | 0776009 | 11/1991 |
| EP | 0582017 | 2/1994 |
| EP | 0617570 | 9/1994 |
| EP | 0635836 | 1/1995 |
| EP | 741508 | 11/1996 |
| EP | 0757320 | 2/1997 |
| EP | 0757351 | 2/1997 |
| EP | 0840476 | 5/1998 |
| EP | 1 045 301 A | 10/2000 |
| EP | 1209557 | 5/2002 |
| EP | 1422713 | 5/2004 |
| EP | 1234308 | 5/2006 |
| EP | 1760722 | 3/2007 |
| EP | 1612798 | 11/2007 |
| GB | 2241118 | 8/1991 |
| GB | 2276275 | 9/1994 |
| GB | 2299436 | 10/1996 |
| GB | 2312984 | 11/1997 |
| GB | 2328782 | 3/1999 |
| GB | 2439844 | 7/2008 |
| JP | 61-115279 | 6/1986 |
| JP | 62-177621 | 8/1987 |
| JP | 62-239394 | 10/1987 |
| JP | 62-251915 | 11/1987 |
| JP | 63-002160 | 1/1988 |
| JP | 63-004483 | 1/1988 |
| JP | 63-016482 | 1/1988 |
| JP | 63-062057 | 3/1988 |
| JP | 63-201946 | 8/1988 |
| JP | 63-214972 | 9/1988 |
| JP | 63-269376 | 11/1988 |
| JP | 63-195697 | 12/1988 |
| JP | 64-089034 | 4/1989 |
| JP | 2-091565 | 3/1990 |
| JP | 2-098197 | 4/1990 |
| JP | 2-185784 | 7/1990 |
| JP | 2-199690 | 8/1990 |
| JP | 2-278375 | 11/1990 |
| JP | 2-297770 | 12/1990 |
| JP | 3-008086 | 1/1991 |
| JP | 3-078160 | 4/1991 |
| JP | 3-105704 | 5/1991 |
| JP | 3-207947 | 9/1991 |
| JP | 3-210662 | 9/1991 |
| JP | 3-212859 | 9/1991 |
| JP | 3-214490 | 9/1991 |
| JP | 3-240821 | 10/1991 |
| JP | 3-295071 | 12/1991 |
| JP | 4-017134 | 1/1992 |
| JP | 4-143989 | 5/1992 |
| JP | 4-172658 | 6/1992 |
| JP | 4-214288 | 8/1992 |
| JP | 4-247385 | 9/1992 |
| JP | 4-259956 | 9/1992 |
| JP | 4-307440 | 10/1992 |
| JP | 4-325923 | 11/1992 |
| JP | 5-035053 | 2/1993 |
| JP | 5-035415 | 2/1993 |
| JP | 5-066896 | 3/1993 |
| JP | 5-068257 | 3/1993 |
| JP | 5-073566 | 3/1993 |
| JP | 5-073803 | 3/1993 |
| JP | 5-101603 | 4/1993 |
| JP | 5-173718 | 7/1993 |
| JP | 5-189163 | 7/1993 |
| JP | 5-204725 | 8/1993 |
| JP | 5-223551 | 8/1993 |
| JP | 6-004220 | 1/1994 |
| JP | 6-004981 | 1/1994 |
| JP | 6-162645 | 6/1994 |
| JP | 6-181561 | 6/1994 |
| JP | 6-215515 | 8/1994 |
| JP | 6-274943 | 9/1994 |
| JP | 6-314173 | 11/1994 |
| JP | 7-007321 | 1/1995 |
| JP | 7-029364 | 1/1995 |
| JP | 7-037376 | 2/1995 |
| JP | 7-056654 | 3/1995 |

(56) References Cited

FOREIGN PATENT DOCUMENTS

| | | |
|---|---|---|
| JP | 7-111078 | 4/1995 |
| JP | 7-115497 | 5/1995 |
| JP | 7-201082 | 8/1995 |
| JP | 7-226023 | 8/1995 |
| JP | 7-230669 | 8/1995 |
| JP | 7-257525 | 10/1995 |
| JP | 1982246 | 10/1995 |
| JP | 7-307059 | 11/1995 |
| JP | 8007994 | 1/1996 |
| JP | 8-030398 | 2/1996 |
| JP | 8-030407 | 2/1996 |
| JP | 8-079672 | 3/1996 |
| JP | 8-106776 | 4/1996 |
| JP | 8-110821 | 4/1996 |
| JP | 8-167231 | 6/1996 |
| JP | 8-212015 | 8/1996 |
| JP | 8-244313 | 9/1996 |
| JP | 8-263525 | 10/1996 |
| JP | 8-263909 | 10/1996 |
| JP | 8-297957 | 11/1996 |
| JP | 2553315 | 11/1996 |
| JP | 9-044445 | 2/1997 |
| JP | 9-064571 | 3/1997 |
| JP | 9-082081 | 3/1997 |
| JP | 2635127 | 7/1997 |
| JP | 9-306094 | 11/1997 |
| JP | 9-319466 | 12/1997 |
| JP | 10-040021 | 2/1998 |
| JP | 10-049365 | 2/1998 |
| JP | 10-064173 | 3/1998 |
| JP | 10-098521 | 4/1998 |
| JP | 2771297 | 7/1998 |
| JP | 10-275137 | 10/1998 |
| JP | 10-281799 | 10/1998 |
| JP | 10-320128 | 12/1998 |
| JP | 10-340139 | 12/1998 |
| JP | 2862679 | 3/1999 |
| JP | 11-134852 | 5/1999 |
| JP | 11-139839 | 5/1999 |
| JP | 2906930 | 6/1999 |
| JP | 11-203201 | 7/1999 |
| JP | 11-213182 | 8/1999 |
| JP | 11-327800 | 11/1999 |
| JP | 11-353128 | 12/1999 |
| JP | 11-353129 | 12/1999 |
| JP | 2000-056935 | 2/2000 |
| JP | 2000-066845 | 3/2000 |
| JP | 2000-112831 | 4/2000 |
| JP | 2000-113563 | 4/2000 |
| JP | 2000-114759 | 4/2000 |
| JP | 2000-125290 | 4/2000 |
| JP | 3052183 | 4/2000 |
| JP | 2000-132704 | 5/2000 |
| JP | 2000-149431 | 5/2000 |
| JP | 2000-228686 | 8/2000 |
| JP | 2000-235762 | 8/2000 |
| JP | 2000-236188 | 8/2000 |
| JP | 2000-242598 | 9/2000 |
| JP | 2000-278647 | 10/2000 |
| JP | 3097994 | 10/2000 |
| JP | 2000-305860 | 11/2000 |
| JP | 2001-005501 | 1/2001 |
| JP | 2001-023270 | 1/2001 |
| JP | 2001-100925 | 4/2001 |
| JP | 2002-42446 | 2/2002 |
| JP | 2007-87498 | 4/2007 |
| JP | 2007-188615 | 7/2007 |
| JP | 2007-220184 | 8/2007 |
| JP | 2007-293936 | 11/2007 |
| JP | 2007-305206 | 11/2007 |
| JP | 2007-305290 | 11/2007 |
| JP | 2007-328761 | 12/2007 |
| JP | 2008-503824 | 2/2008 |
| KR | 10-1998-0035445 | 8/1998 |
| KR | 10-0176527 | 11/1998 |
| KR | 10-0214308 | 8/1999 |
| KR | 10-0403039 | 10/2003 |
| SG | 45223 | 1/1998 |
| TW | 387574 | 4/2000 |
| WO | WO 89/01682 | 8/1988 |
| WO | WO 97/06532 | 2/1997 |
| WO | WO 00/49487 | 2/2000 |
| WO | WO 00/67253 | 11/2000 |
| WO | WO 01/09627 | 2/2001 |
| WO | WO 01/41148 | 6/2001 |
| WO | WO 03/013783 | 2/2003 |
| WO | WO 03/021597 | 3/2003 |
| WO | WO 03/021598 | 3/2003 |
| WO | WO 03/067385 | 8/2003 |
| WO | WO 2004/006260 | 1/2004 |
| WO | WO 2004/114286 | 12/2004 |
| WO | WO 2005/024830 | 3/2005 |
| WO | WO 2005/024831 | 3/2005 |
| WO | WO 2005/109131 | 11/2005 |
| WO | WO 2006/030185 | 3/2006 |
| WO | WO 2006/048611 | 5/2006 |
| WO | WO 2006/100441 | 9/2006 |
| WO | WO 2006/100445 | 9/2006 |
| WO | WO 2007/031729 | 3/2007 |

OTHER PUBLICATIONS

International Preliminary Report on Patentability issued Mar. 14, 2013 in International application No. PCT/US2011/046919, 5 pgs.
Abraham et al., "Thermal Proximity Imaging of Hard-Disk Substrates", IEEE Transactions on Mathematics 36:3997-4004, Nov. 2000.
Abramovitch, "Rejecting Rotational Disturbances on Small Disk Drives Using Rotational Accelerometers", Proceedings of the 1996 IFAC World Congress in San Francisco, CA, Jul. 1996 http://dabramovitch.com/pubs/amrfac_matj.pdf.
Ali et al., "Modeling and Simulation of Hard Disk Drive Final Assembly Using a HDD Template" Proceedings of the 2007 Winter Simulation Conference, IEEE pp. 1641-1650, 2007 http://portal.acm.org/citation.cfm?id=1351837.
Anderson et al., "Clinical chemistry: concepts and applications", The McGraw-Hill Companies, Inc., pp. 131-132, 2003.
Anderson et al., "High Reliability Variable Load Time Controllable Vibration Free Thermal Processing Environment", Delphion, hhtps://www.delphion.com/tdbs/tdb?order=93A+63418, 3 pages, Mar. 18, 2009.
Asbrand, "Engineers at One Company Share the Pride and the Profits of Successful Product Design", Professional Issues, 4 pages, 1987.
Bair et al., "Measurements of Asperity Temperatures of a Read/Write Head Slider Bearing in Hard Magnetic Recording Disks", Journal of Tribology 113:547-554, Jul. 1991.
Bakken et al., "Low Cost, Rack Mounted, Direct Access Disk Storage Device", www.ip.com, 4 pages, Mar. 3, 2005.
Biber et al., "Disk Drive Drawer Thermal Management", Advances in Electronic Packaging vol. 1:43-46, 1995.
Christensen, "How Can Great firms Fail? Insights from the hard Disk Drive Industry", Harvard Business School Press, pp. 1-26, 2006.
Chung et al., "Vibration Absorber for Reduction of the In-plane Vibration in an Optical Disk Drive", IEEE Transactions on Consumer Electronics, Vo. 48, May 2004.
Curtis et al., "InPhase Professional Archive Drive Architecture" Dec. 17, 2007 http://www.science.edu/TechoftheYear/Nominees/InPhase/Holographic%20Storage.pdf.
Findeis et al., "Vibration Isolation Techniques Sutiable for Portable Electronic Speckle Pattern Interferometry", Proc. SPIE vol. 4704, pp. 159-167, 2002 http://www.ndt.uct.ac.za/Papers/spiendt2002.pdf.
FlexStar Technology, 30E/Cascade Users Manual, Doc #98-36387-00 Rev. 1.8, pp. 1-33, Jun. 1, 2004.
FlexStar Technology, "A World of Storage Testing Solutions," http://www.flexstar.com, 1 page (1999).
FlexStar Technology, "Environment Chamber Products," http://www.flexstar.com, 1 page (1999).
FlexStar Technology, "FlexStar's Family of Products," http://www.flexstar.com, 1 page (1999).

(56) References Cited

OTHER PUBLICATIONS

Frankovich, "The Basics of Vibration Isolation Using Elastomeric Materials", EARSC, 2005 http://www.isoloss.com/pdfs/engineering/BasicsofVibrationIsolation.pdf.
Grochowski et al., "Future Trends in Hard Disk Drives" IEEE Transactions on Magnetics, vol. 32, No. 3, pp. 1850-1854, May 1996 http://svn.tribler.org/abc/branches/leo/dataset/preferences/johan/johan-68.pdf.
Gurumurthi et al., "Disk Drive Roadmap from the Thermal Perspective: A Case for Dynamic Thermal Management", International Symposium on Computer Architecture, Proceedings of the $32^{nd}$ Annual International Symposium on Computer Architecture, IEEE Computer Society, pp. 38-49, 2005 http://portal.acm.org/citation.cfm?id=1069807.1069975.
Gurumurthi, "The Need for temperature-Aware Storage Systems", The Tenth Intersociety conference on Thermal and Thermomechanical Phenomena in Electronics, ITHERM pp. 387-394, 2006.
Gurumurthi et al., "Thermal Issues in Disk Drive Design: Challenges and Possible Solutions", ACM Transactions on Storage 2:41-73, Feb. 2006.
Haddad et al., "A new Mounting Adapter For Computer Peripherals with Improved Reliability, Thermal Distribution, Low Noise and Vibration Reduction", ISPS, Advances in Information Storage and Processing Systems, 1:97-108, 1995.
Henderson, "HAD High Aerial Densities Require Solid Test Fixtures", Flexstar Technology, Feb. 26, 2007.
HighBeam Research website "ACT debuts six-zone catalytic gas heater. (American Catalytic Technologies offers new heaters)" www.highbeam.com, 4 pages, 1998.
HighBeam Research website "Asynchronous Testing Increases Throughput." www.highbeam.com, 7 pages, 2000.
HighBeam Research website "Credence announces Production Release of the EPRO AQ Series for Integrated Test and Back-end Processing." www.highbeam.com, 4 pages, 1995.
HighBeam Research website "Test Multiple Parts At Once for Air Leaks. (Brief Article)", www.highbeam.com, 1 page, 1999.
Iwamiya, "Hard Drive Cooling Using a Thermoelectric Cooler", EEP-vol. 19-2, Advances in Electronic Packaging, vol. 2:2203-2208, ASME 1997.
Johnson et al., "Performance Measurements of Tertiary Storage Devices", Proceedings of the $24^{th}$ VLDB Conference, New York, pp. 50-61, 1998.
Ku, "Investigation of Hydrodynamic Bearing Friction in Data Storage information System Spindle Motors", ISPSVol. 1, Advances in Information Storage and Processing Systems, pp. 159-165, ASME 1995.
Lindner, "Disk drive mounting", IBM Technical Disclosure Brochure, vol. 16, No. 3, pp. 903-904, Aug. 1973.
McAuley, "Recursive Time Trapping for Synchronization of Product and CHAMBER Profiles for Stress Test", Delphion, www.delphion.com/tdbs/tdb?order=88A+60957, 3 pages, Mar. 18, 2009.
Morgenstern, Micropolis Drives Target High-end Apps; Technology Provides Higher Uninterrupted Data Transfer. (Applications; Microdisk AV LS 3020 and 1050AV and 1760AV LT Stackable Hard Drive Systems) (Product Announcement) MacWeek, vol. 8, No. 6, p. 8; Feb. 7, 1994.
Morris, "Zero Cost Power and Cooling Monitor System", www.delphion.com/tdbs/tdb?order=94A+61950, 3 pages, Jan. 15, 2008.
Nagarajan, "Survey of Cleaning and cleanliness Measurement in Disk Drive Manufacture", North Carolina Department of Environment and Natural Resources, Feb. 1997.
Notification of Transmittal of The International Search Report and the Written Opinion of the International Searching Authority, or the Declaration, PCT/US2008/086181, 15 pages, Mar. 16, 2009.
Park, "Vibration and Noise Reduction of an Optical Disk Drive by Using a Vibration Absorber Methods and Apparatus for Securing Disk Drives in a Disk", IEEE Transactions on Consumer Electronics, vol. 48, Nov. 2002.
Prater et al., "Thermal and Heat-Flow Aspects of Actuators for Hard Disk Drives", InterSociety Conference on Thermal Phenomena, pp. 261-268, 1994.
Ruwart et al., "Performance Impact of External Vibration on Consumer-grade and enterprise-class Disk Drives", Proceedings of the $22^{nd}$ IEEE/$13^{th}$ Goddard Conference on Mass Storage Systems and Technologies, 2005.
Seagate Product Marketing, "Seagate's Advanced Multidrive System (SAMS) Rotational Vibration Feature", Publication TP-229D, Feb. 2000.
Schroeder et al., "Disk Failures in the Real World: What does an MTTP of 1,000,000 hours mean to you?", In FAST'07: $5^{th}$ USENIX Conference on File and Storage Technologies, San Jose, CA, Feb. 14-16, 2007.
Schulze et al., "How Reliable is a Raid?," COMPCON Spring apos; 89. Thirty-Fouth IEEE Computer Society International Conference: Intellectual Leverage, Digest of papers; pp. 118-123, Feb. 27-Mar. 3, 1989.
Terwiesch et al., "An Exploratory Study of International Product Transfer and Production Ramp-Up in the Data Storage Industry", The Information Storage Industry Center, University of California, www-irps.ucsd.edu/~sloan/, pp. 1-31, 1999.
Tzeng, "Dynamic Torque Characteriestics of Disk-Drive Spindle Bearings", ISPS-vol. 1, Advances in Information Storage and Processing Systems, pp. 57-63, ASME 1995.
Tzeng, "Measurements of Transient Thermal Strains in a Disk-Drive Actuator", InterSociety conference on Thermal Phenomena, pp. 269-274, 1994.
Wilson-7000 disk Drive Analyzer Product Literature, date accessed Jan. 28, 2009, 2 pages.
Winchester, "Automation Specialists Use Machine Vision as a System Development Tool", IEE Computing & Control Engineering, Jun./Jul. 2003.
Xyratex website "Storage Infrastructure" www.xyratex.com/Products/storage-infrastructure/default.aspx 1995-2008.
Xyratex website "Production Test Systems" www.xyratex.com/Products/production-test-systems/default.aspx 1995-2008.
Xyratex website "Single cell—Production Test Systems" www.xyratex.com/products/production-test-system/single-cell.aspx 1995-2008.
Xyratex website "Continuous Innovation—Production Test Systems" www.xyratex.com/products/production-test-systems/continuous-innovation.aspx 1995-2008.
Xyratex website "Key Advantages—Production Test Systems" www.xyratex.com/products/production-test-systems/advantages.aspx 1995-2008.
Xyratex website "Testing Drives Colder—Production Test Systems" www.xyratex.com/products/productino-test-systems/colder.aspx 1995-2008.
"Xyratex to Debut its New Automated Test Solution for 2.5-Inch Disk Drives at DISKCON USA 2004" 2004 PR Newswire Europe www.prnewswire.co.uk/cgi/news/release?id=130103.
"Automated Production Test Solutions", Xyratex Product Test brochure, 2006.
Xyratex "Process Challenges in the Hard Drive Industry" slide presentation, 2006 Asian Diskcon.
Suwa et al., "Evaluation System for Residual Vibration from HDD Mounting Mechanism" IEEE Transactions on Magnetics, vol. 35, No. 2, pp. 868-873, Mar. 1999.
Suwa et al., "Rotational Vibration Suppressor" IBM Technical Disclosure Bulletin Oct. 1991.
Yee Leong Low et al., "Thermal network model for temperature prediction in hard disk drive" Journal Microsystem Technologies, vol. 15, No. 10-11, pp. 1653-1656, Oct. 2009 http://www.springerlink.com/content/20668jn67pk426r5/.
Annex to Form PCT/ASA/206 Communication Relating to the Results of the Partial International Search, for International Application No. PCT/US2008/086814, dated Apr. 3, 2009, 5 pages.
Annex to Form PCT/ASA/206 Communication Relating to the Results of the Partial International Search, for International Application No. PCT/US2008/086809, dated Apr. 3, 2009, 1 page.

(56) References Cited

OTHER PUBLICATIONS

Notification of Transmittal of the International Search Report and the Written Opinion of the International Searching Authority, or the Declaration, for International Application No. PCT/US2009/039926, Sep. 1, 2009, 13 pages.
Notification of Transmittal of the International Search Report and the Written Opinion of the International Searching Authority, or the Declaration, for International Application No. PCT/US2009/039591, Aug. 31, 2009, 10 pages.
Notification of Transmittal of the International Search Report and the Written Opinion of the International Searching Authority, or the Declaration, for International Application No. PCT/US2008/086814, Sep. 18, 2009, 17 pages.
Notification of Transmittal of the International Search Report and the Written Opinion of the International Searching Authority, or the Declaration, for International Application No. PCT/US2009/039888, Sep. 28, 2009, 13 pages.
Notification of Transmittal of the International Search Report and the Written Opinion of the International Searching Authority, or the Declaration, for International Application No. PCT/US2009/039921, Sep. 25, 2009, 14 pages.
Notification of Transmittal of the International Search Report and the Written Opinion of the International Searching Authority, or the Declaration, for International Application No. PCT/US2009/040058, Sep. 29, 2009, 13 pages.
Notification of Transmittal of the International Search Report and the Written Opinion of the International Searching Authority, or the Declaration, for International Application No. PCT/US2009/040829, Oct. 28, 2009, 13 pages.
Notification of Transmittal of the International Search Report and the Written Opinion of the International Searching Authority, or the Declaration, for International Application No. PCT/US2009/039590, Oct. 30, 2009, 10 pages.
Notification of Transmittal of the International Search Report and the Written Opinion of the International Searching Authority, or the Declaration, for International Application No. PCT/US2009/040835, Oct. 30, 2009, 13 pages.
Notification of Transmittal of the International Search Report and the Written Opinion of the International Searching Authority, or the Declaration, for International Application No. PCT/US2009/040757, Nov. 24, 2009, 12 pages.
Notification of Transmittal of the International Search Report and the Written Opinion of the International Searching Authority, or the Declaration, for International Application No. PCT/US2009/039898, Nov. 24, 2009, 12 pages.
Notification of Transmittal of the International Search Report and the Written Opinion of the International Searching Authority, or the Declaration, for International Application No. PCT/US2009/040795, Nov. 26, 2009, 13 pages.
Notification of Transmittal of the International Search Report and the Written Opinion of the International Searching Authority, or the Declaration, for International Application No. PCT/US2009/045583, Nov. 27, 2009, 13 pages.
Notification of Transmittal of the International Search Report and the Written Opinion of the International Searching Authority, or the Declaration, for International Application No. PCT/US2009/040888, Dec. 29, 2009, 14 pages.
Notification of Transmittal of the International Search Report and the Written Opinion of the International Searching Authority, or the Declaration, for International Application No. PCT/US2009/040894, Dec. 22, 2009, 12 pages.
Notification of Transmittal of the International Search Report and the Written Opinion of the International Searching Authority, or the Declaration, for International Application No. PCT/US2009/039934, Dec. 23, 2009, 12 pages.
Notification of Transmittal of the International Search Report and the Written Opinion of the International Searching Authority, or the Declaration, for International Application No. PCT/US2009/040965, Dec. 23, 2009, 12 pages.
Notification of Transmittal of the International Search Report and the Written Opinion of the International Searching Authority, or the Declaration, for International Application No. PCT/US2009/040973, Jan. 11, 2010, 13 pages.
Cardinal Intellectual Property's search report including the results of a search for the features of the claims included in the U.S. patent application entitled "Transferring Disk Drives Within Disk Drive Testing Systems", inventors: Polyakov et al, and having assigned U.S. Appl. No. 12/727,150. The foregoing U.S. patent application is a continuation of U.S. Appl. No. 12/104,536. Revised as of May 27, 2010.
Cardinal Intellectual Property's search report including the results of a search for the features of the claims included in the U.S. patent application entitled "Transferring Storage Devices Within Storage Device Testing Systems", inventors: John P. Toscano et al., and having assigned U.S. Appl. No. 12/727,201. The foregoing U.S. patent application is a continuation of U.S. Appl. No. 12/424,980. Revised as of Jan. 4, 2010.
Cardinal Intellectual Property's search report including the results of a search for the features of the claims included in the U.S. patent application entitled "Processing Storage Devices", inventors: Richard W. Slocum III., and having assigned U.S. Appl. No. 12/727,619. The foregoing U.S. patent application is a continuation of U.S. Appl. No. 12/474,388. Revised as of Jan. 5, 2009.
Cardinal Intellectual Property's search report including the results of a search for the features of the claims included in the U.S. patent application entitled "Bulk Feeding Disk Drives To Disk Drive Testing Systems", inventors: Noble et al., and having assigned U.S. Appl. No. 12/726,856. The foregoing U.S. patent application is a continuation of U.S. Appl. No. 12/104,869. Revised as of Jan. 15, 2010.
Cardinal Intellectual Property's search report including the results of a search for the features of the claims included in the U.S. patent application entitled "Dependent Temperature Control Within Disk Drive Testing Systems", inventors: Merrow et al., and having assigned U.S. Appl. No. 12/727,207. The foregoing U.S. patent application is a continuation of U.S. Appl. No. 12/105,069. Revised as of Jan. 13, 2010.
Cardinal Intellectual Property's search report including the results of a search for the features of the claims included in the U.S. patent application entitled "Test Slot Cooling System for a Storage Device Testing System", inventors: Merrow et al., and having assigned U.S. Appl. No. 12/727,700. The foregoing U.S. patent application is a continuation of U.S. Appl. No. 12/503,567. Revised as of Jan. 13, 2010.
Cardinal Intellectual Property's search report including the results of a search for the features of the claims included in the U.S. patent application entitled "Storage Device Testing System Cooling", inventors: Brian S. Merrow and having assigned U.S. Appl. No. 12/775,560. The foregoing U.S. patent application is a continuation of U.S. Appl. No. 12/698,575. Revised as of Feb. 17, 2010.
Cardinal Intellectual Property's search report including the results of a search for the features of the claims included in the U.S. patent application entitled "Conductive Heating", inventors: Brian S. Merrow et al., and having assigned U.S. Appl. No. 12/760,164. The foregoing U.S. patent application is a continuation of U.S. Appl. No. 12/503,593. Revised as of Jan. 6, 2010.
Cardinal Intellectual Property's search report including the results of a search for the features of the claims included in the U.S. patent application entitled "Storage Device Temperature Sensing", inventors: Brian S. Merrow et al., and having assigned U.S. Appl. No. 12/760,305. The foregoing U.S. patent application is a continuation of U.S. Appl. No. 12/503,687. Revised as of Jan. 7, 2010.
Cardinal Intellectual Property's search report including the results of a search for the features of the claims included in the U.S. patent application entitled "Solid State Temperature Control of Hard Drive Tester", inventors: Brian S. Merrow and having assigned U.S. Appl. No. 12/856,056. The foregoing U.S. patent application is a continuation of U.S. Appl. No. 12/105,103. Revised as of Jan. 14, 2010.
Cardinal Intellectual Property's search report including the results of a search for the features of the claims included in the U.S. patent application entitled "Vibration Isolation Within Disk Drive Testing Systems", inventors: Brian S. Merrow and having assigned U.S.

(56) References Cited

OTHER PUBLICATIONS

Appl. No. 12/767,142. The foregoing U.S. patent application is a continuation of U.S. Appl. No. 12/105,105. Revised as of Jan. 12, 2010.

Cardinal Intellectual Property's search report including the results of a search for the features of the claims included in the U.S. patent application entitled "Disk Drive Clamping Transport and Testing", inventors: Brian S. Merrow et al., and having assigned U.S. Appl. No. 12/766,680. The foregoing U.S. patent application is a continuation of U.S. Appl. No. 11/959,133. Revised as of Jan. 14, 2010.

Cardinal Intellectual Property's search report including the results of a search for the features of the claims included in the U.S. patent application entitled "Chilled Water Temp Control of Disk Drive Tester", inventors: Brian S. Merrow and having assigned U.S. Appl. No. 12/766,680. The foregoing U.S. patent application is a continuation of U.S. Appl. No. 12/105,061. Revised as of Feb. 18, 2010.

Cardinal Intellectual Property's search report including the results of a search for the features of the claims included in the U.S. patent application entitled "Vibration Isolation Within Disk Drive Testing Systems," inventors: Brian S. Merrow and having assigned U.S. Appl. No. 12/767,142. The foregoing U.S. patent application is a continuation of U.S. Appl. No. 12/105,105. Revised as of Mar. 30, 2010.

Cardinal Intellectual Property's search report including the results of a search for the features of the claims included in the U.S. patent application entitled "Disk Drive Clamping Transport and Testing," inventors: Brian S. Merrow et al., and having assigned U.S. Appl. No. 12/767,113. The foregoing U.S. patent application is a continuation of U.S. Appl. No. 11/959,133. Revised as of Apr. 4, 2010.

Cardinal Intellectual Property's search report including the results of a search for the features of the claims included in the U.S. patent application entitled "Disk Drive Clamping Transport and Testing,", inventors: Brian S. Merrow et al., and having assigned U.S. Appl. No. 12/766,680. The foregoing U.S. patent application is a continuation of U.S. Appl. No. 11/959,133. Revised as of Apr. 1, 2010.

Exhibit 1 in *Xyratex Technology, Ltd.* v. *Teradyne, Inc.*; Newspaper picture that displays the CSO tester; 1990.

Exhibit 2 in *Xyratex Technology, Ltd.* v. *Teradyne, Inc.*; Photos of the CSO tester obtained from Hitachi; 1990.

Exhibit 1326 in *Xyratex Technology, Ltd.* v. *Teradyne, Inc.*; Image of the back of Exhibit 1 and Exhibit 2 photos, which display the photos' dates; 1990.

Exhibit 1314 in *Xyratex Technology, Ltd.* V. *Teradyne, Inc.*; Case, "Last products of Disk-File Development at Hursley and Millbrook," IBM, Oct. 12, 1990.

Exhibit 1315 in *Xyratex Technology, Ltd.* V. *Teradyne, Inc.*; Case, "History of Disk-File Development at Hursley and Millbrook," IBM, Oct. 17, 1990.

*Xyratex Technology, Ltd.* V. *Teradyne, Inc.*, Teradyne, Inc's Prior Art Notice Pursuant to 35 U.S.C. Section 282. Case No. CV 08-04545 SJO (PLAx), Oct. 16, 2009.

*Xyratex Technology, Ltd.* V. *Teradyne, Inc.*, Amended Joint Trial Exhibit List of Xyratex and Teradyne. Case No. CV 08-04545 SJO (PLAx), Nov. 12, 2009.

Notification of Transmittal of the International Search Report and the Written Opinion of the International Searching Authority, or the Declaration, for International Application No. PCT/GB2005/003490, Jan. 26, 2006, 10 pages.

\* cited by examiner

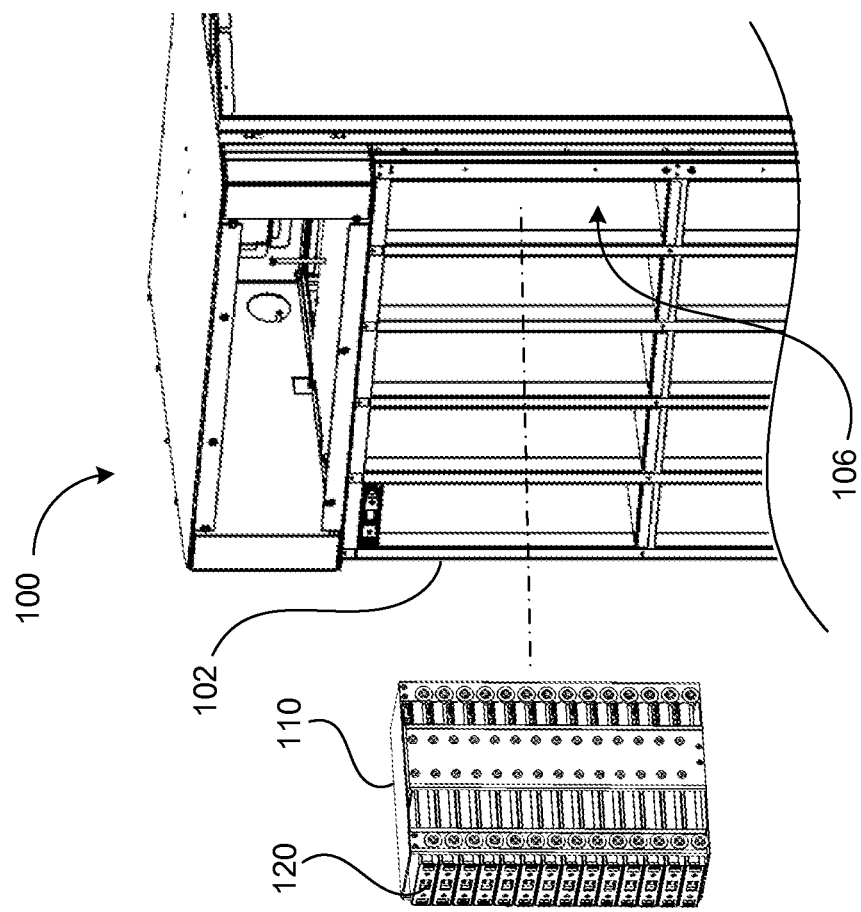

ENGAGING TEST SLOTS

TECHNICAL FIELD

This disclosure relates to engaging test slots and related devices, systems, and methods.

BACKGROUND

Storage device manufacturers typically test manufactured storage devices for compliance with a collection of requirements. Test equipment and techniques exist for testing large numbers of storage devices serially or in parallel. Manufacturers tend to test large numbers of storage devices simultaneously. Storage device testing systems typically include one or more tester racks having multiple test slots that receive storage devices for testing. In some cases, the storage devices are placed in carriers which are used for loading and unloading the storage devices to and from the test racks.

The testing environment immediately around the storage device is regulated. Minimum temperature fluctuations in the testing environment may be critical for accurate test conditions and for safety of the storage devices. In addition, the latest generations of disk drives, which have higher capacities, faster rotational speeds and smaller head clearance, are more sensitive to vibration. Excess vibration can affect the reliability of test results and the integrity of electrical connections. Under test conditions, the drives themselves can propagate vibrations through supporting structures or fixtures to adjacent units. This vibration "cross-talking," together with external sources of vibration, contributes to bump errors, head slap and non-repetitive run-out (NRRO), which may result in lower yields and increased manufacturing costs. Current disk drive testing systems employ automation and structural support systems that contribute to excess vibrations in the system and/or require large footprints.

SUMMARY

In general, this disclosure relates to engaging test slots and related devices, systems, methods, and means.

In one aspect, a test slot is engaged with automated machinery to inhibit movement of the test slot, thereby inhibiting transmission of vibration from the test slot to its surroundings. While the automated machinery is engaged with the test slot, the automated machinery is actuated to insert a storage device into the test slot, or remove the storage device from the test slot.

In another aspect, an apparatus includes at least one engaging element configured to engage a test slot to inhibit movement of the test slot, thereby inhibiting transmission of vibration from the test slot to its surroundings. The apparatus further includes an automated transporter, while the at least one engaging element is engaged with the test slot, configured to insert a storage device into the test slot; or remove the storage device from the test slot.

In another aspect, automated machinery includes means for engaging a test slot to inhibit movement of the test slot, thereby inhibiting transmission of vibration from the test slot to its surroundings. The automated machinery also includes means for, while the automated machinery is engaged with the test slot, inserting a storage device into the test slot, or removing the storage device from the test slot.

Embodiments may include one or more of the following features. The automated machinery engages the test slot with one or more actuators. The one or more actuators include one or more first engaging elements. The test slot includes one or more second engaging elements. Engaging the test slot includes causing the one first engaging elements to temporarily connect to the one or more second engaging elements. The one or more first engaging elements may include an element selected from a group consisting of: a pin, a recess, a slot, a magnet, an adhesive, a clasp, and a hook. The one or more first engaging elements may alternatively be constructed so as to present a surface to engage the test slot by friction. The one or more second engaging elements may include an element selected from a group consisting of: a pin, a recess, a slot, a magnet, an adhesive, a clasp, and a hook. The one or more second engaging elements may alternatively be constructed so as to present a surface to be engaged by friction. The automated machinery includes a robot that includes a manipulator for carrying the storage device. The actuators are coupled to the robot and/or the manipulator. The storage device is carried by a storage device transporter. The automated machinery includes a robot and a manipulator for engaging the storage device transporter, and the actuators are coupled to the robot and/or the manipulator. The at least engaging element is configured to temporarily connect to one or more second engaging elements of the test slot. The at least one engaging element includes an element selected from a group consisting of a pin, a recess, a slot, a magnet, an adhesive, a clasp, and a hook. The at least one engaging element is adapted to engage the test slot by friction. The one or more second engaging elements include an element selected from a group consisting of a pin, a recess, a slot, a magnet, an adhesive, a clasp, and a hook. The automated transporter comprises a robot that comprises a manipulator for carrying the storage device, wherein the at least one engaging element is coupled to the robot and/or the manipulator. The storage device is carried by the automated transporter.

The details of one or more embodiments are set forth in the accompanying drawings and the description below. Other features, objects, and advantages will be apparent from the description and drawings, and from the claims.

DESCRIPTION OF DRAWINGS

FIG. 2B is a detailed perspective view of a carrier receptacle from the test rack of FIG. 2A.

Like reference symbols in the various drawings indicate like elements.

DETAILED DESCRIPTION

System Overview

Figure 1:
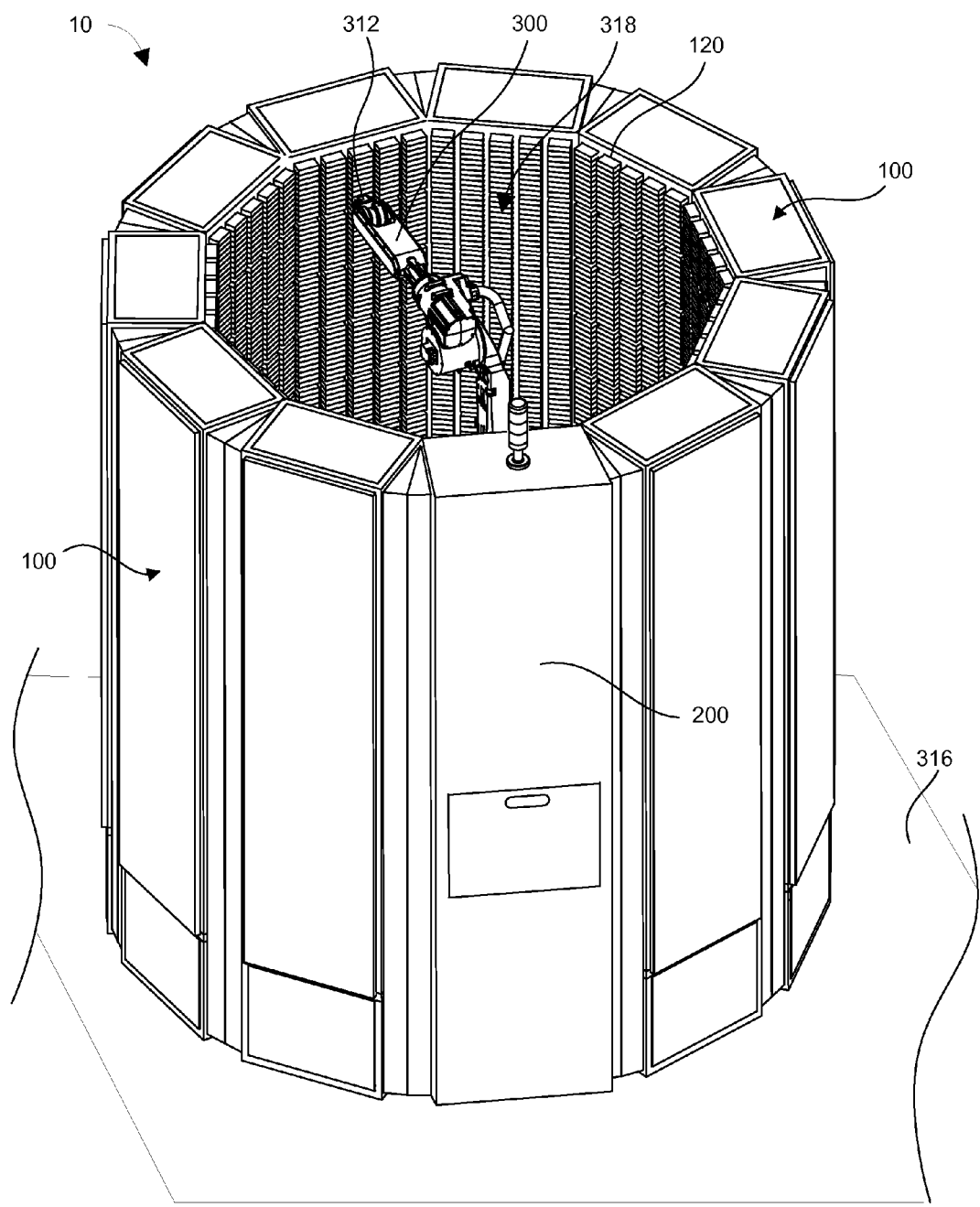
FIG. 1 is a perspective view of a storage device testing system.
Figure 2A:
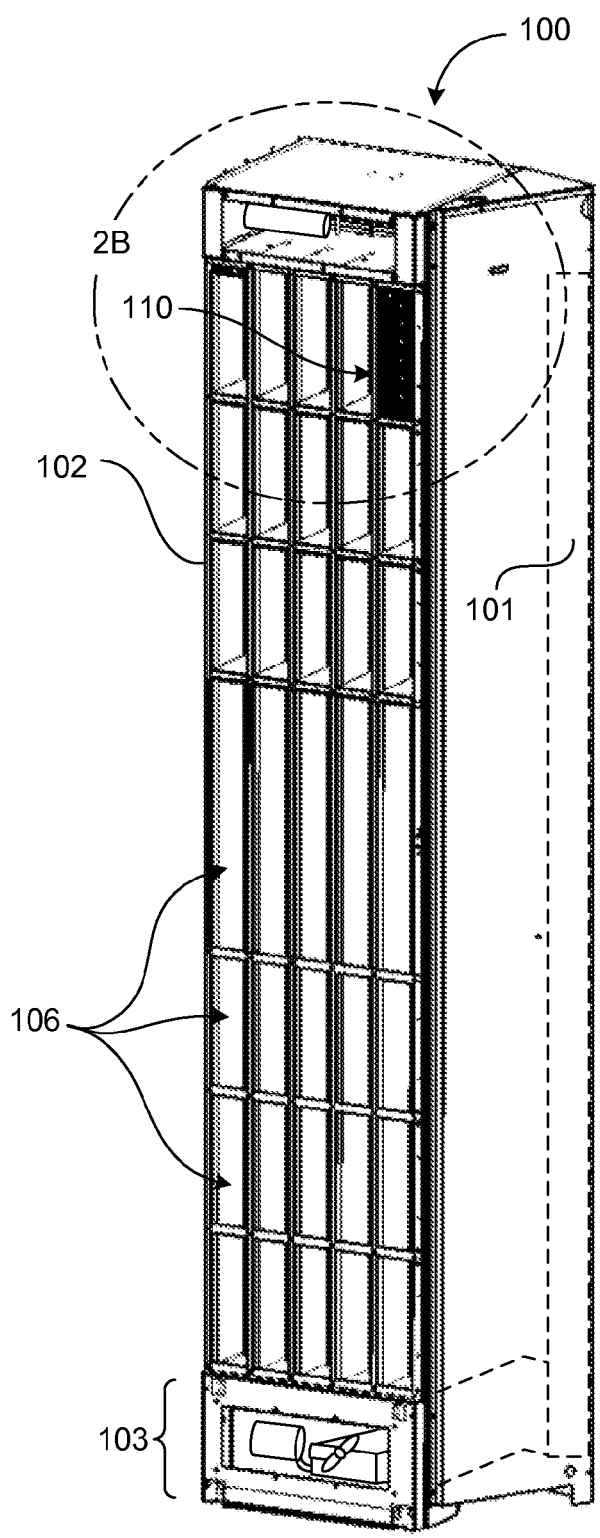
FIG. 2A is perspective view of a test rack.

As shown in FIG. 1, a storage device testing system 10 includes a plurality of test racks 100 (e.g., 10 test racks shown), a transfer station 200, and a robot 300 (sometimes referred to as an "automated transporter"). As shown in FIGS. 2A and 2B, each test rack 100 generally includes a chassis 102. The chassis 102 can be constructed from a plurality of structural members 104 (e.g., formed sheet metal, extruded aluminum, steel tubing, and/or composite members) which are fastened together and together define a plurality of carrier receptacles 106.

Figure 3A:
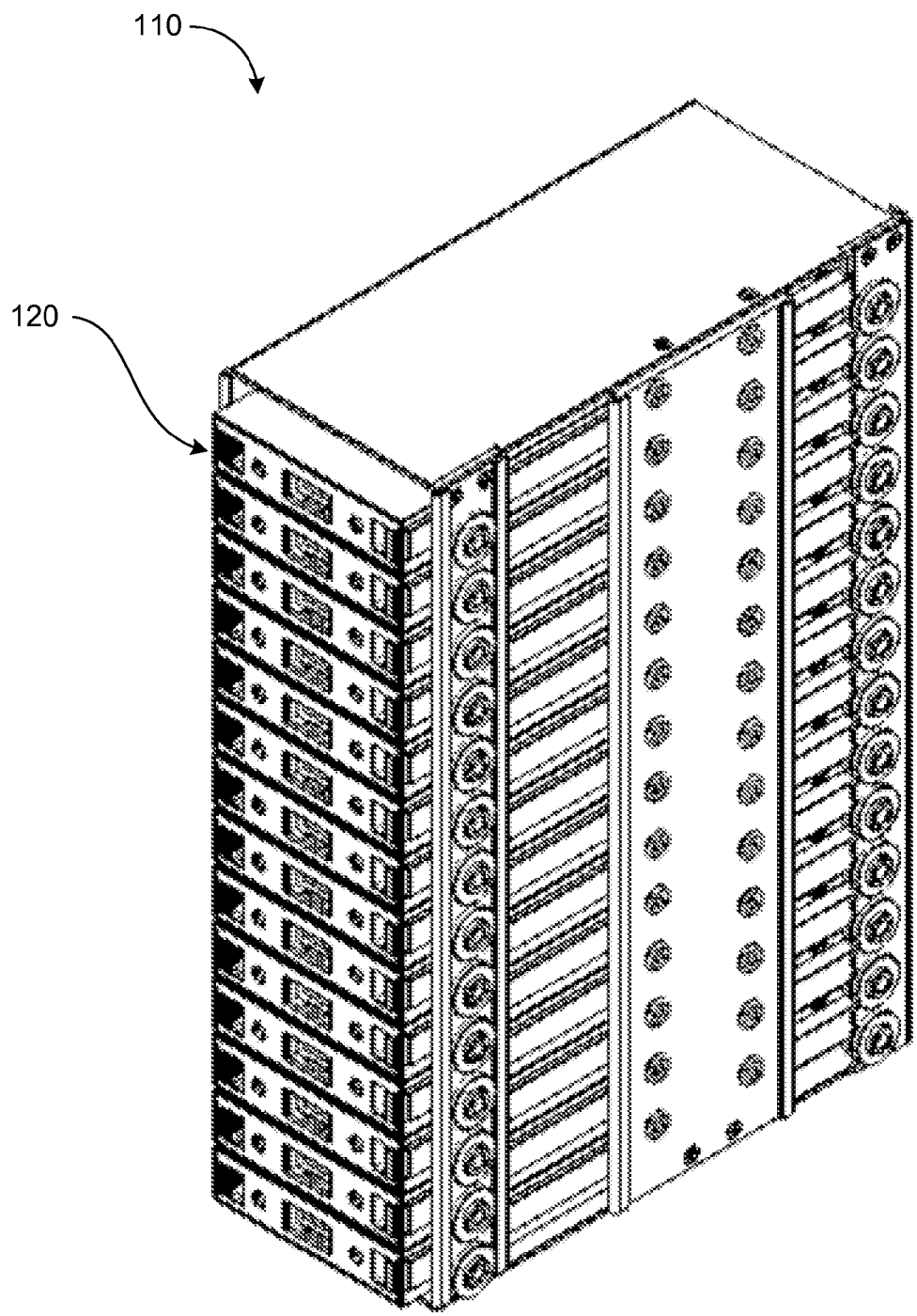
FIGS. 3A and 3B are front and back perspective views, respectively, of a test slot carrier.
Figure 3B:
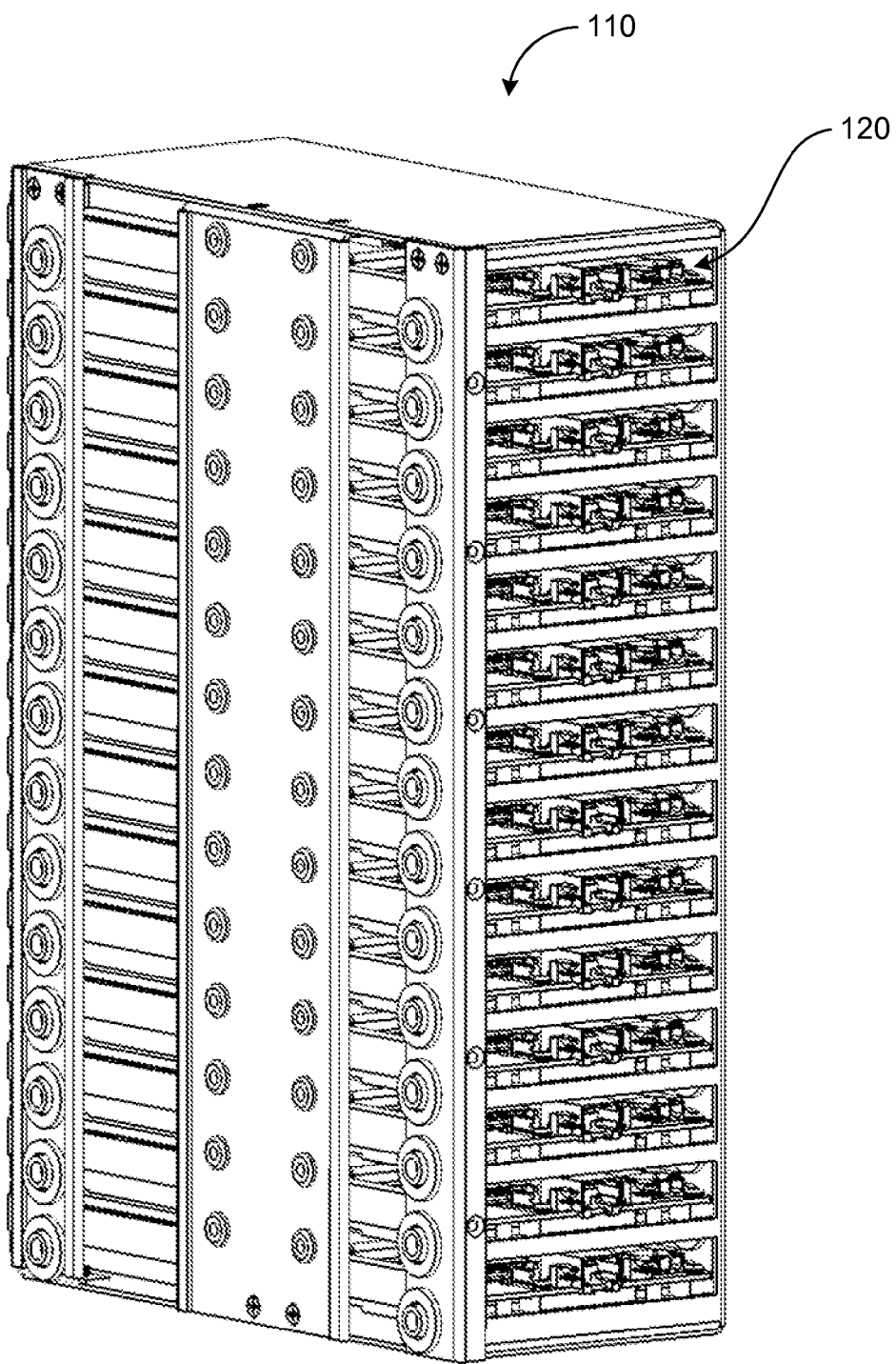

Each carrier receptacle 106 can support a test slot carrier 110. As shown in FIGS. 3A and 3B, each test slot carrier 110 supports a plurality of test slot assemblies 120. Different ones of the test slot carriers 110 can be configured for performing different types of tests and/or for testing different types of storage devices. The test slot carriers 110 are also interchangeable with each other within among the many carrier receptacles 106 within the testing system 10 allowing for adaptation and/or customization of the testing system 10, e.g., based on testing needs.

A storage device, as used herein, includes disk drives, solid state drives, memory devices, and any device that benefits from asynchronous testing. A disk drive is generally a non-volatile storage device which stores digitally encoded data on rapidly rotating platters with magnetic surfaces. A solid-state drive (SSD) is a data storage device that uses solid-state memory to store persistent data. An SSD using SRAM or DRAM (instead of flash memory) is often called a RAM-drive. The term solid-state generally distinguishes solid-state electronics from electromechanical devices.

Figure 4:
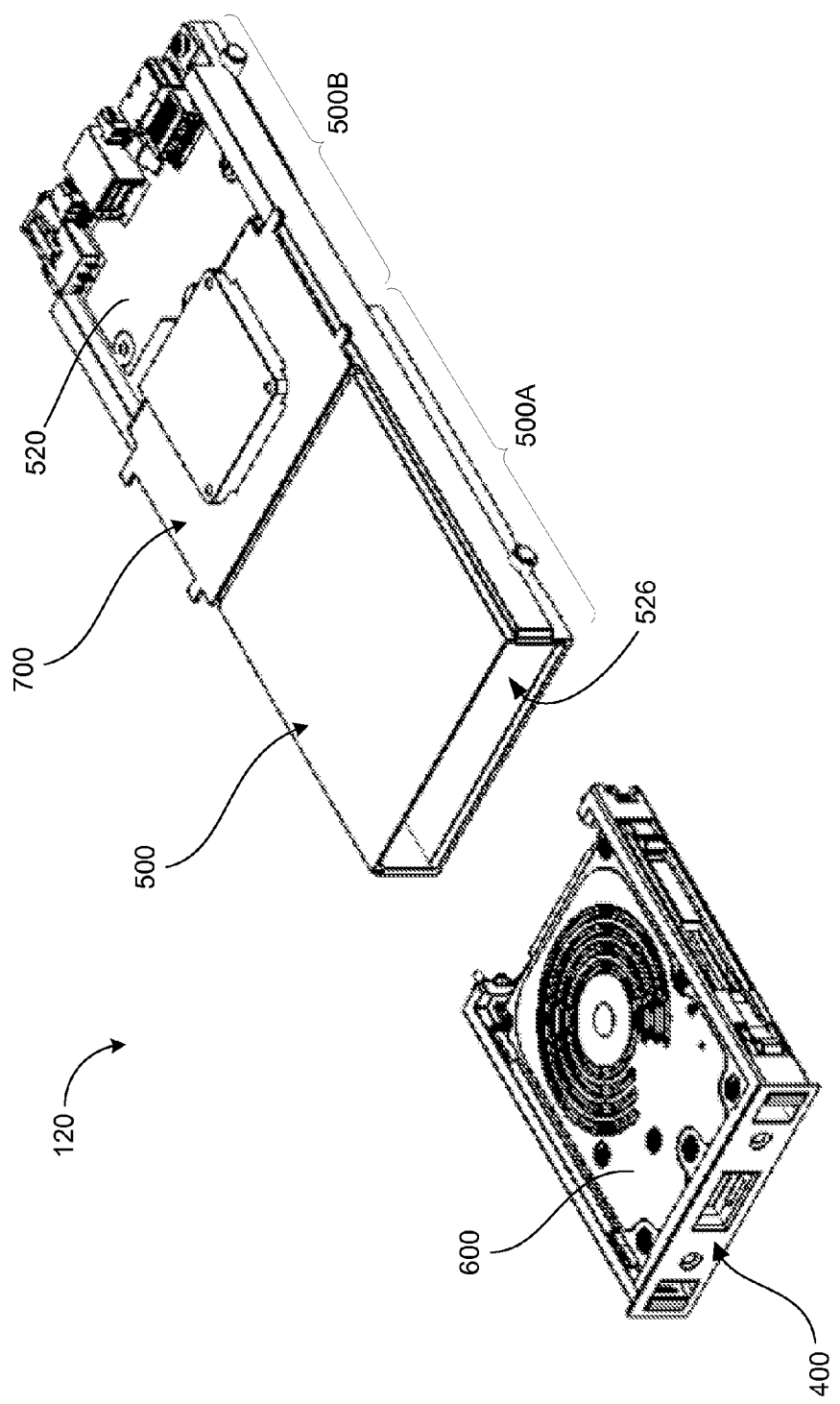
FIG. 4 is a perspective view of a test slot assembly.
Figure 9:
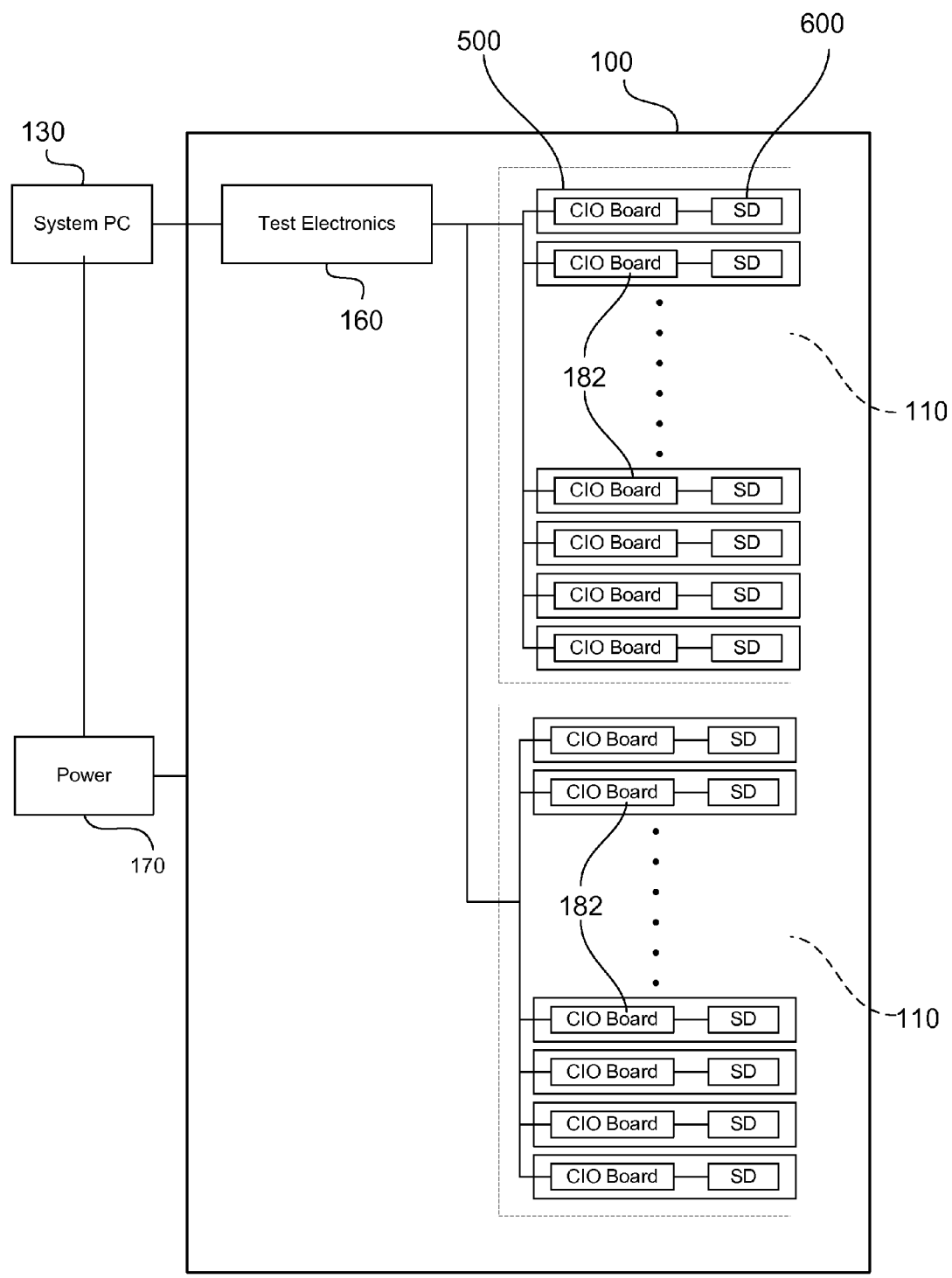
FIG. 9 is a schematic view of test circuitry.

As shown in FIG. 4, each test slot assembly 120 includes a storage device transporter 400, a test slot 500, and an associated air mover assembly 700. The storage device transporter 400 may be used for capturing storage devices 600 (e.g., from the transfer station 200) and for transporting the storage device 600 to one of the test slots 500 for testing. The test slot includes a rear portion 500B and a front portion 500A. The front portion 500A defines a test compartment 526 for receiving one of the storage device transporters 400. The rear portion 500B carries a connection interface board 520, which carries a connection interface circuit 182 (FIG. 9).

Figure 5:
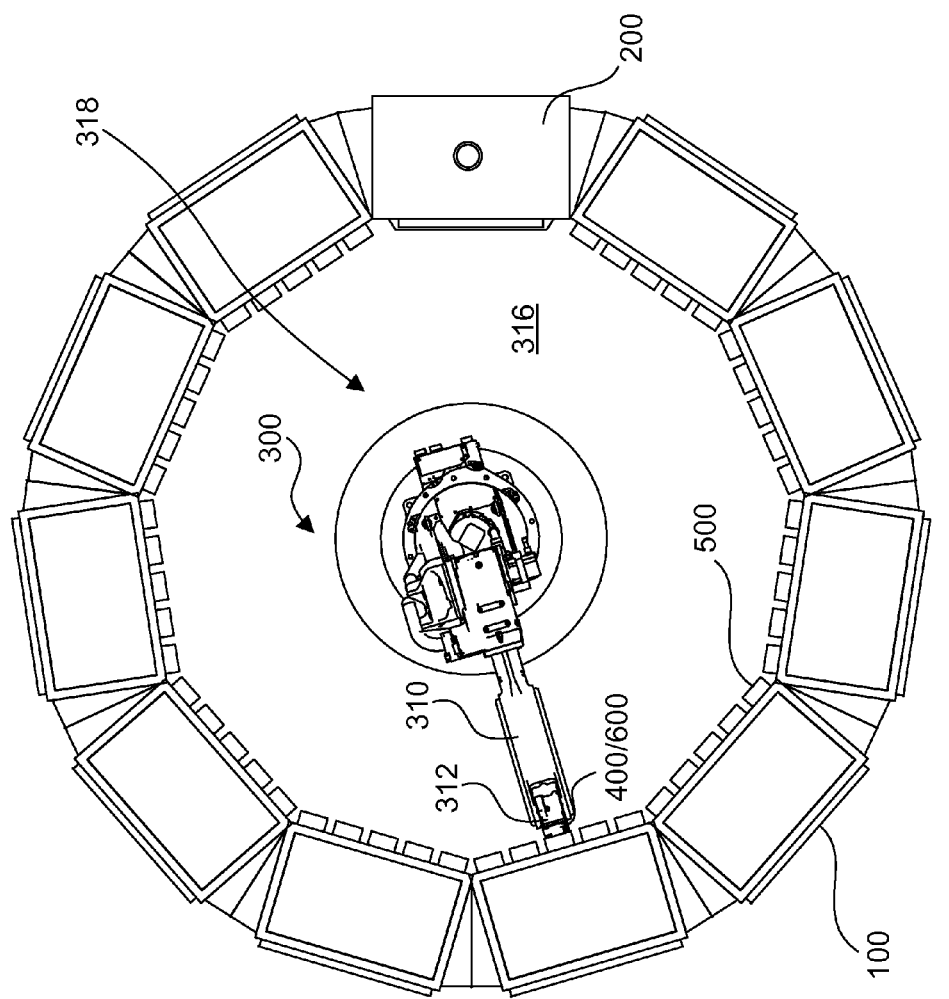
FIG. 5 is a top view of a storage device testing system.
Figure 6:
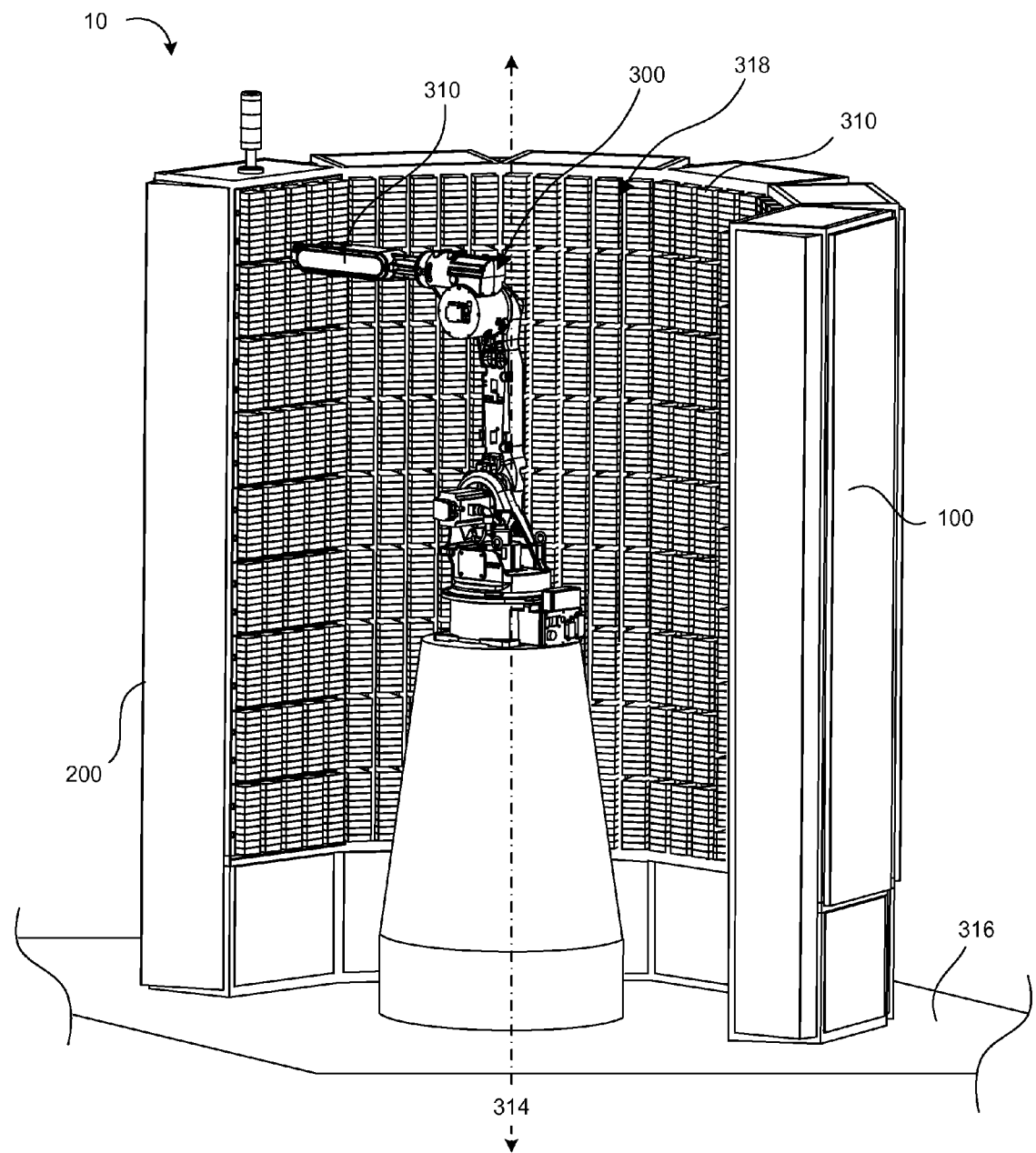
FIG. 6 is a perspective view of a storage device testing system.

Referring to FIGS. 5 and 6, the robot 300 includes a robotic arm 310 and a manipulator 312 (FIG. 5) disposed at a distal end of the robotic arm 310. The robotic arm 310 defines a first axis 314 (FIG. 6) normal to a floor surface 316 and is operable to rotate through a predetermined arc about and extends radially from the first axis 314 within a robot operating area 318. The robotic arm 310 is configured to independently service each test slot 500 by transferring storage devices 600 between the transfer station 200 and the test racks 100. In some embodiments, the robotic arm 310 is configured to remove a storage device transporter 400 from one of the test slots 500 with the manipulator 312, then pick up a storage device 600 from the transfer station 200 with the storage device transporter 400, and then return the storage device transporter 400, with a storage device 600 therein, to the test slot 500 for testing of the storage device 600. After testing, the robotic arm 310 retrieves the storage device transporter 400, along with the supported storage device 600, from one of the test slots 500 and returns it to the transfer station 200 (or moves it to another one of the test slots 500) by manipulation of the storage device transporter 400 (i.e., with the manipulator 312). In some embodiments, the robotic arm 310 is configured to pick up a storage device 600 from the transfer station 200 with the manipulator 312, then move the storage device 600 to a test slot 500, and deposit the storage device 600 in the test slot 500 by means of depositing the storage device 600 in the storage device transporter 400 and then inserting the storage device transporter in the test slot 500. After testing, the robotic arm 310 uses the manipulator 312 to remove the storage device 600 from the storage device transporter 400 and return it to the transfer station 200.

Figure 7A:
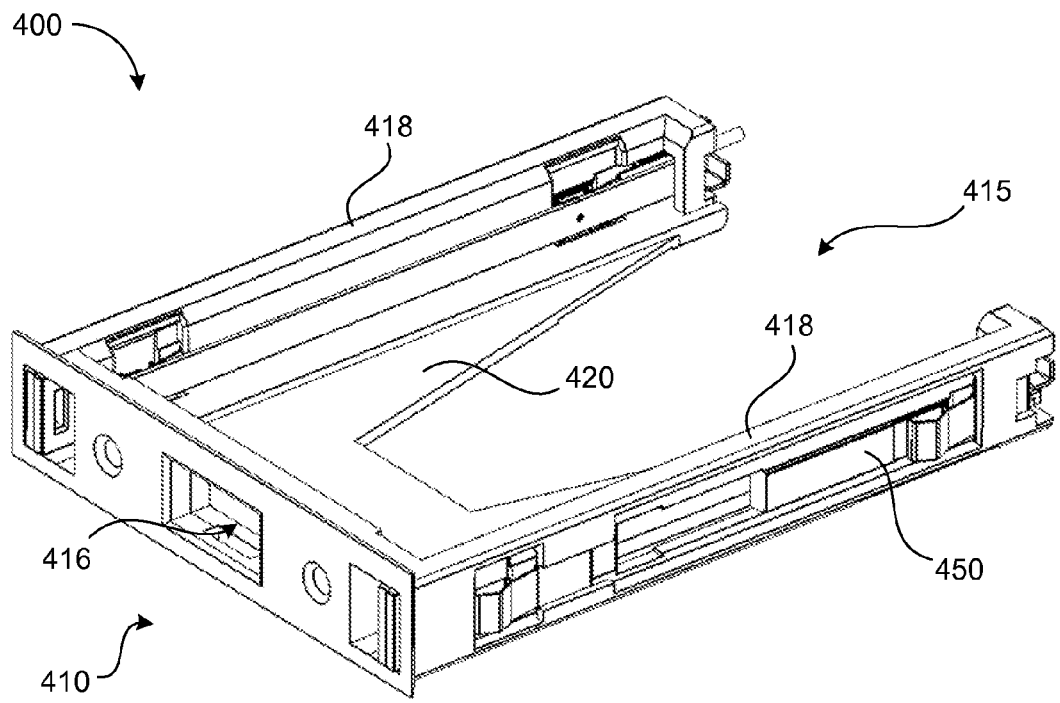
FIGS. 7A and 7B are perspective views of a storage device transporter.
Figure 7B:
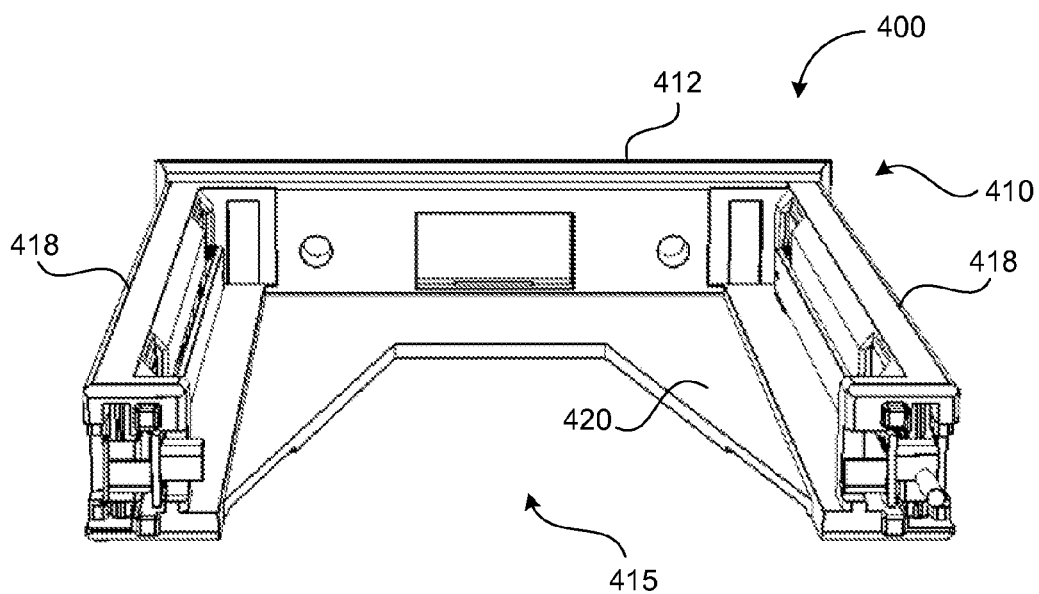

Referring to FIGS. 7A and 7B, the storage device transporter 400 includes a frame 410 and a clamping mechanism 450. The frame 410 includes a face plate 412. As shown in FIG. 7A, along a first surface 414, the face plate 412 defines an indentation 416. The indentation 416 can be releaseably engaged by the manipulator 312 (FIG. 5) of the robotic arm 310, which allows the robotic arm 310 to grab and move the transporter 400. In use, one of the storage device transporters 400 is removed from one of the test slots 500 with the robot 300 (e.g., by grabbing, or otherwise engaging, the indentation 416 of the transporter 400 with the manipulator 312 of the robot 300). The frame 410 defines a substantially U-shaped opening 415 formed by sidewalls 418 and a base plate 420.

Figure 8A:
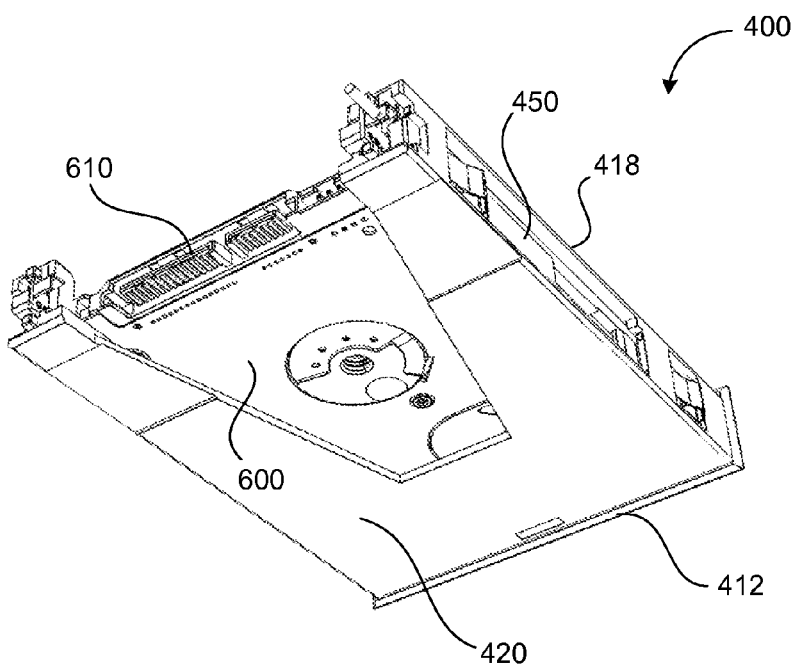
FIG. 8A is a perspective view of a storage device transporter supporting a storage device.
Figure 8B:
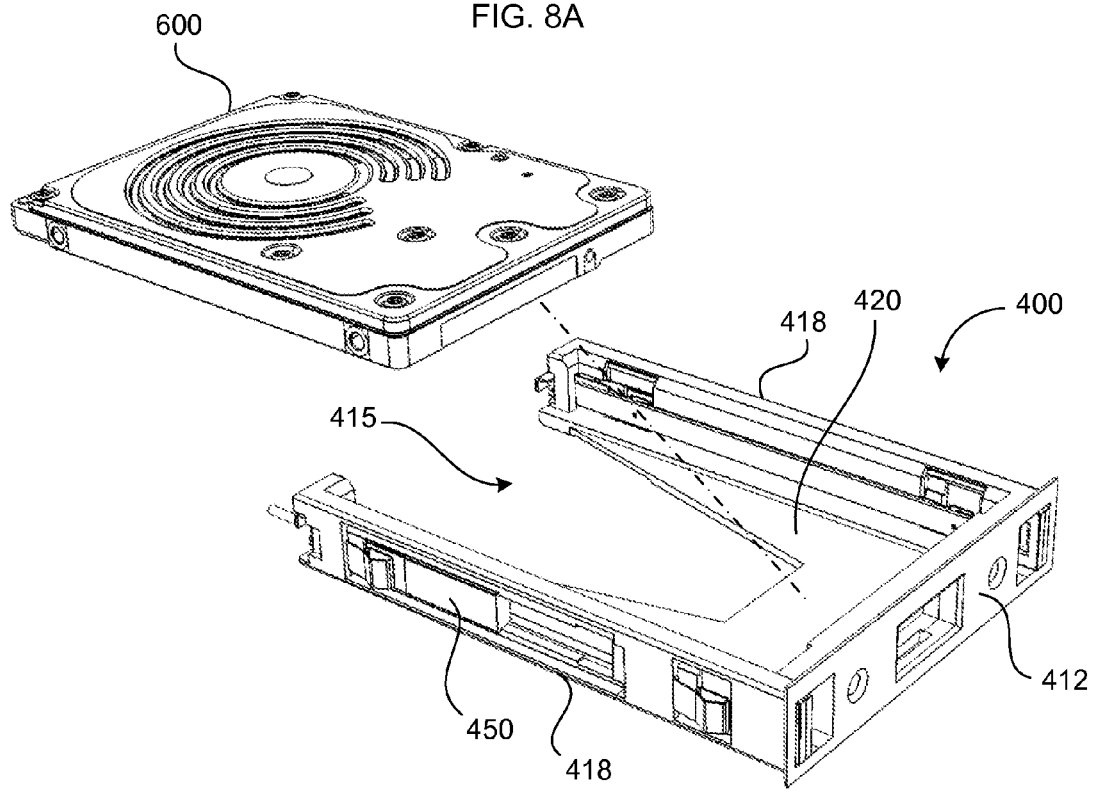
FIG. 8B is a perspective view of a storage device transporter receiving a storage device.
Figure 8C:
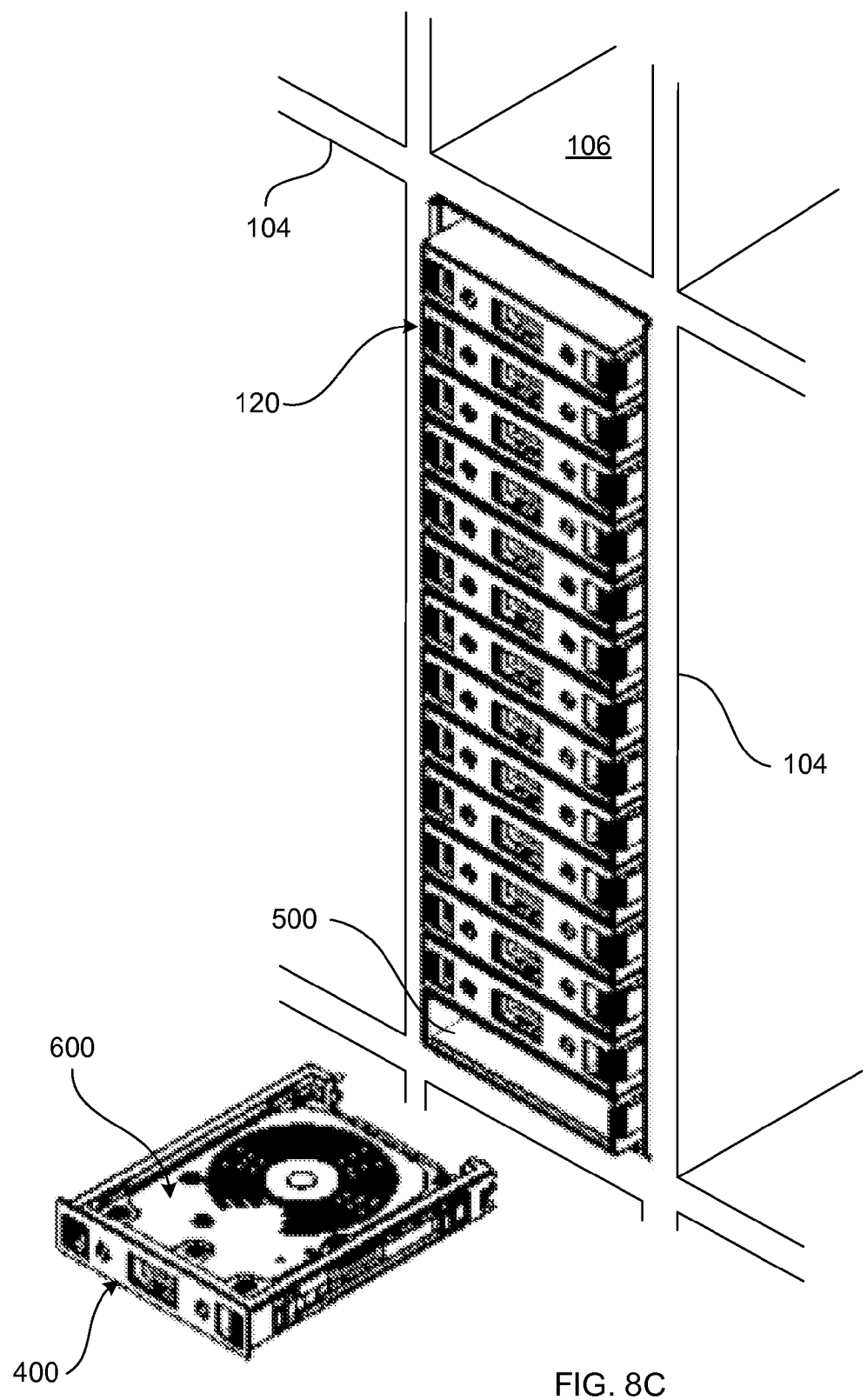
FIG. 8C is a perspective view of a storage device transporter carrying a storage device aligned for insertion into a test slot.

Referring to FIGS. 8A, 8B, and 8C, with the storage device 600 in place within the frame 410 of the storage device transporter 400, the storage device transporter 400 and the storage device 600 together can be moved by the robotic arm 310 (FIG. 5) for placement within one of the test slots 500. The manipulator 312 (FIG. 5) is also configured to initiate actuation of a clamping mechanism 450 disposed in the storage device transporter 400. Actuating the clamping mechanism 450 inhibits movement of the storage device 600 relative to the storage device transporter 400. Releasing the clamping mechanism 450 allows for insertion of the storage device transporter 400 into one of the test slots 500. The clamping mechanism 450 may also be configured to engage the test slot 500, once received therein, to inhibit movement of the storage device transporter 400 relative to the test slot 500. In such implementations, once the storage device 600 is in the test position, the clamping mechanism 450 is engaged again (e.g., by the manipulator 312) to inhibit movement of the storage device transporter 400 relative to the test slot 500. The clamping of the transporter 400 in this manner can help to reduce vibrations during testing. Additional details of the transporter 400 and the clamping mechanism 450 and other details and features combinable with those described herein may be found in the following U.S. patent application filed Jul. 15, 2009, entitled "CONDUCTIVE HEATING", with, inventors: Brian S. Merrow et al., and having assigned Ser. No. 12/503,593, the entire contents of the which are hereby incorporated by reference.

Referring to FIG. 9, in some implementations, the storage device testing system 10 can also include at least one computer 130 in communication with the test slots 500. The computer 130 may be configured to provide inventory control of the storage devices 600 and/or an automation interface to control the storage device testing system 10. Test electronics 160 are in communication with each test slot 500. The test electronics 160 are in electrical communication with connection interface circuits 182 that are disposed within each the test slots 500. These connection interface circuits 182 are arranged for electrical communication with a storage device 600 received within the associated test slot 500, and thereby provide for communication between the test electronics 160 and storage devices 600 within the test slots 500, e.g., for executing test routines. The test routines may include a functionality test, which can include testing the amount of power received by the storage device 600, the operating temperature, the ability to read and write data, and the ability to read and write data at different temperatures (e.g. read while hot and write while cold, or vice versa). The functionality test may test every memory sector of the storage device 600 or only random samplings. The functionality test may test an operating temperature of the storage device 600 and also the data integrity of communications with the storage device 600.

As shown in FIG. 9, a power system 170 supplies power to the storage device testing system 10. The power system 170 may monitor and/or regulate power to the received storage device 600 in the test slot 500

Engaging the Test Slot

As mentioned above, storage devices (e.g., storage device 600) are susceptible to shock and vibration during operation and testing. Shock and vibration events can also occur, for example, when a storage device is inserted or removed from a test slot 500. During testing, storage devices are frequently swapped out for different storage devices while the surrounding storage devices are operating or being tested. In some examples, it can be difficult to insert or remove a storage device from the test slot 500 without causing a frame (e.g., frame 502) of the test slot 500 from bumping into the chassis 102 of the test rack 100 (FIGS. 2A and 2B). An impact produced in this way can create a shock or vibration even that is transmitted to adjacent storage devices in other test slots, which degrades the isolation scheme of the test rack 100. This problem can be amplified by the high density of the test rack 100, as the test slots can be located in close proximity to one another to conserve space.

In some examples, additional shock or vibration events can be created while the storage device 600 is pushed against or pulled away from one or more electrical connecting elements located in the test slot 500. In order for the storage device 500 to mate or un-mate with the electrical connecting elements, some degree of force (e.g., 45 Newtons) must be exerted on the storage device 600. This force can be greater than the force require to insert the storage device 600 into the test slot 500.

One way to reduce the likelihood of causing shock or vibration events is to use precision automation. As described above, an automated transporter (e.g., the robot 300 (FIG. 3) can be more precise than a human in precisely inserting or removing a storage device with the correct amount of force. In some examples, however, the location of the test slot 500 may change with loading and with temperature, as the isolators associated with the test slot 500 change shape under stress or with temperature. The automated transporter may thus need to be augmented with a camera, laser position sensors, or the like, to sense the location of the frame. These sensors may slow down the operation, and may still be insufficient, as the mounting frame may move in three linear and three rotary dimensions, and it is difficult to measure and compensate for all of these cost-effectively and quickly.

In some examples, a portion of the robot 300 can engage (e.g., grab, pinch, hug, stabilize, attach to, or the like) a frame of the test slot 500 in order to reduce shock and vibration events caused by inserting or removing a storage device. Engaging the frame of the test slot inhibits movement of the test slot relative to a chassis supporting the test slot, including inhibiting movement in the direction used to insert or remove a storage device from the test slot. By holding on to the test slot 500, the robot 300 can push or pull the storage device relative to the test slot 500 without moving the test slot 500. Thus, forces exerted on the test slot 500 are transmitted to the robot 300, rather than to the chassis 102 and adjacent storage devices.

Certain features of the test slot 500 or the robot 300 can allow the robot 300 to more easily or more effectively engage the test slot 500. These features can also allow the robot 300 to approximately register relative to the test slot 500, and then engage the test slot 500 while moving it into a precise alignment with the robot 300.

Figure 10A:
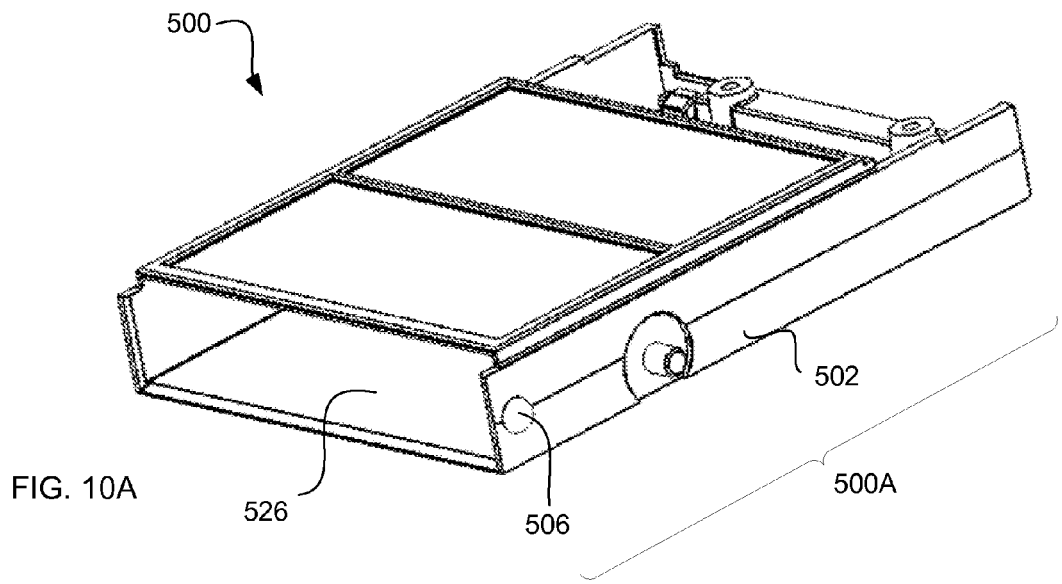
FIGS. 10A and 10B are perspective views of a front portion of a test slot.
Figure 10B:
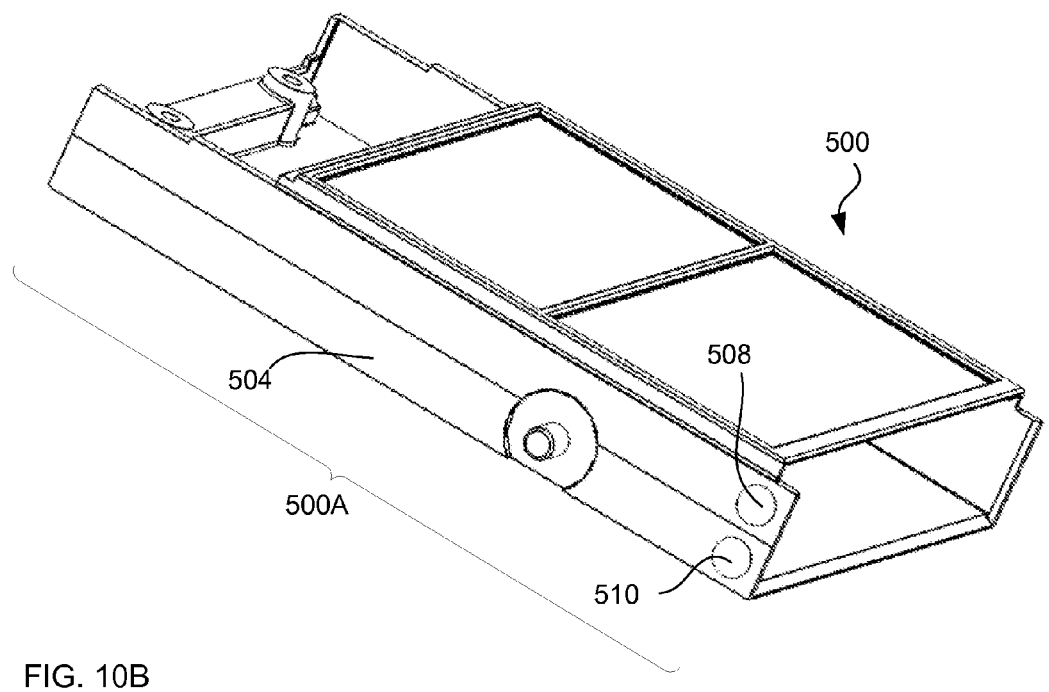

FIGS. 10A and 10B illustrate opposite sides of the test slot 500 (only the front portion 500A of the test slot 500 is shown for clarity). The test slot 500 includes sidewalls 502, 504 with engaging elements 506, 508, and 510 mounted thereon. The engaging elements 506, 508, and 510 are configured to assist the robot 300 in temporarily engaging the test slot 500 before, during, or after the insertion or removal of a storage device. The engaging elements 506, 508, and 510 are configured to engage corresponding engaging elements 512, 514 (FIG. 11) located on actuators 516, 518 (FIG. 11) associated with the robot 300. In this example, the engaging elements 512, 514 are recesses in surfaces 513, 515 of the actuators 516, 518.

Figure 11:
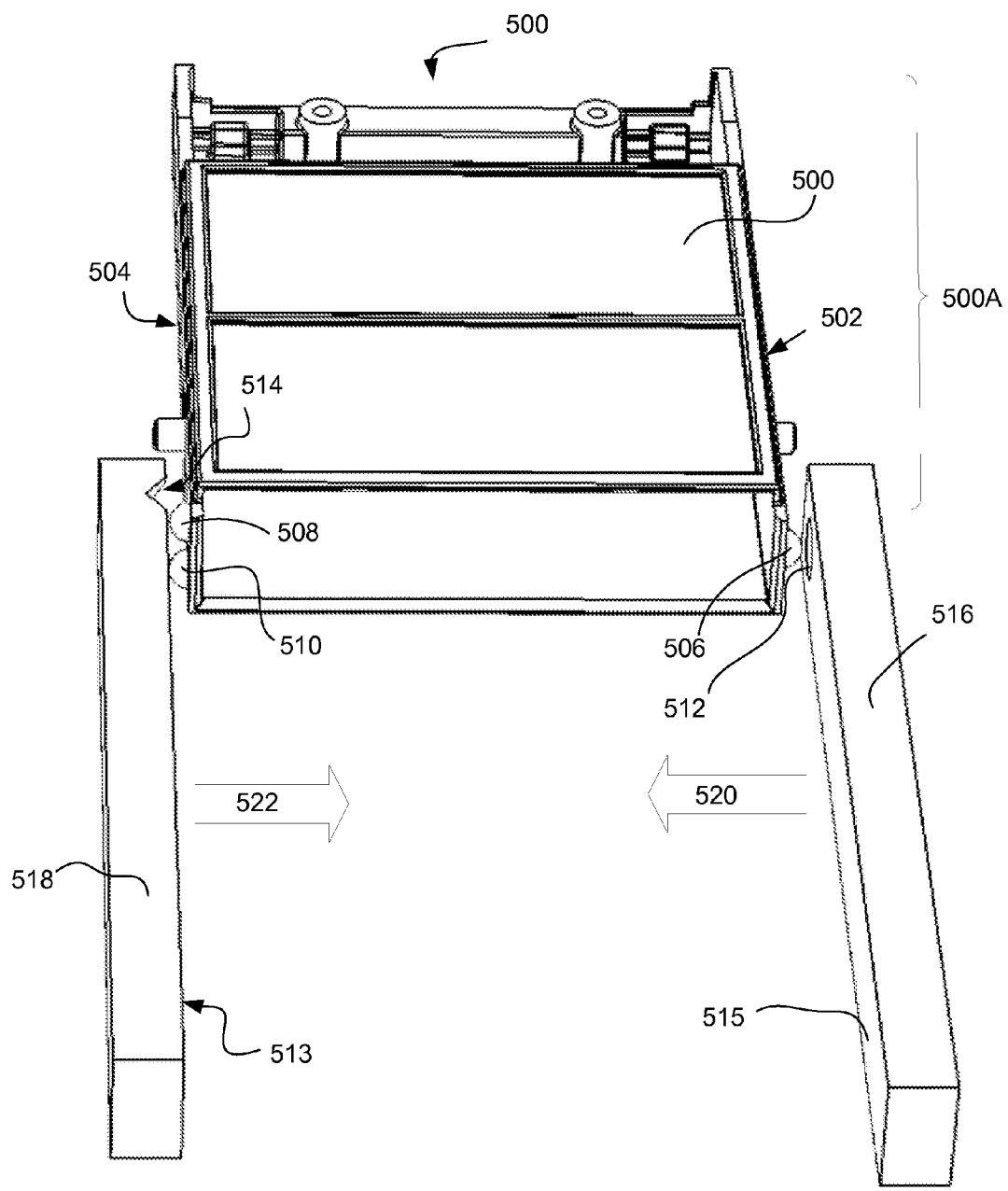
FIG. 11 is a perspective view of a front portion of a test slot being engaged by actuators.
Figure 12A:
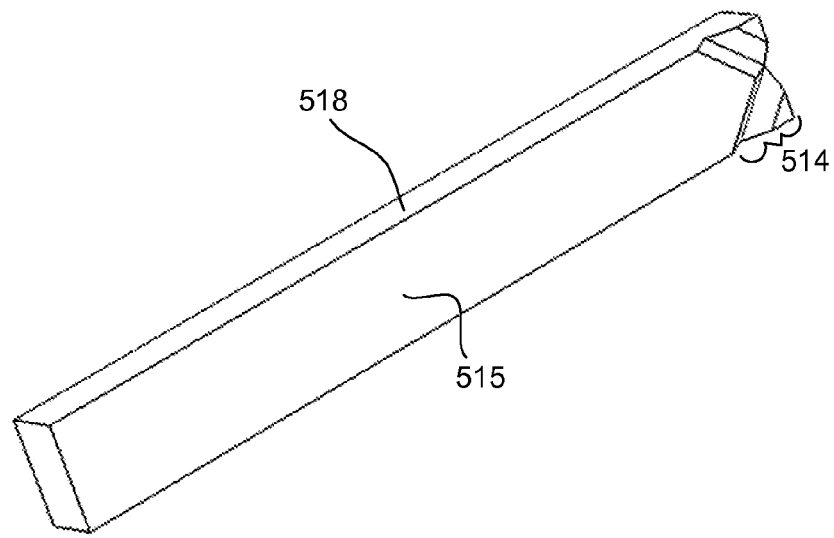
FIGS. 12A and 12B are perspective views of actuators.
Figure 12B:
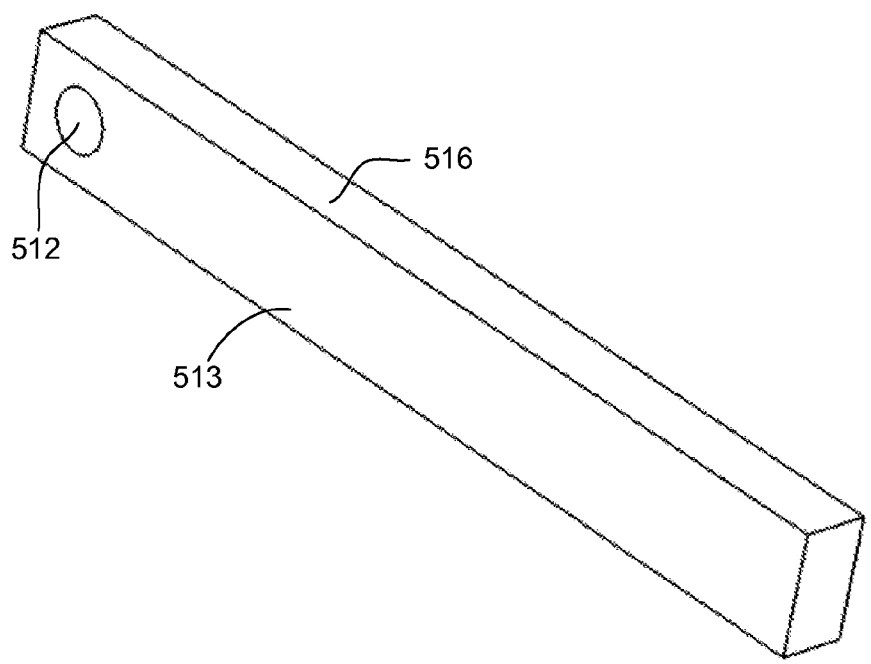
Figure 13:
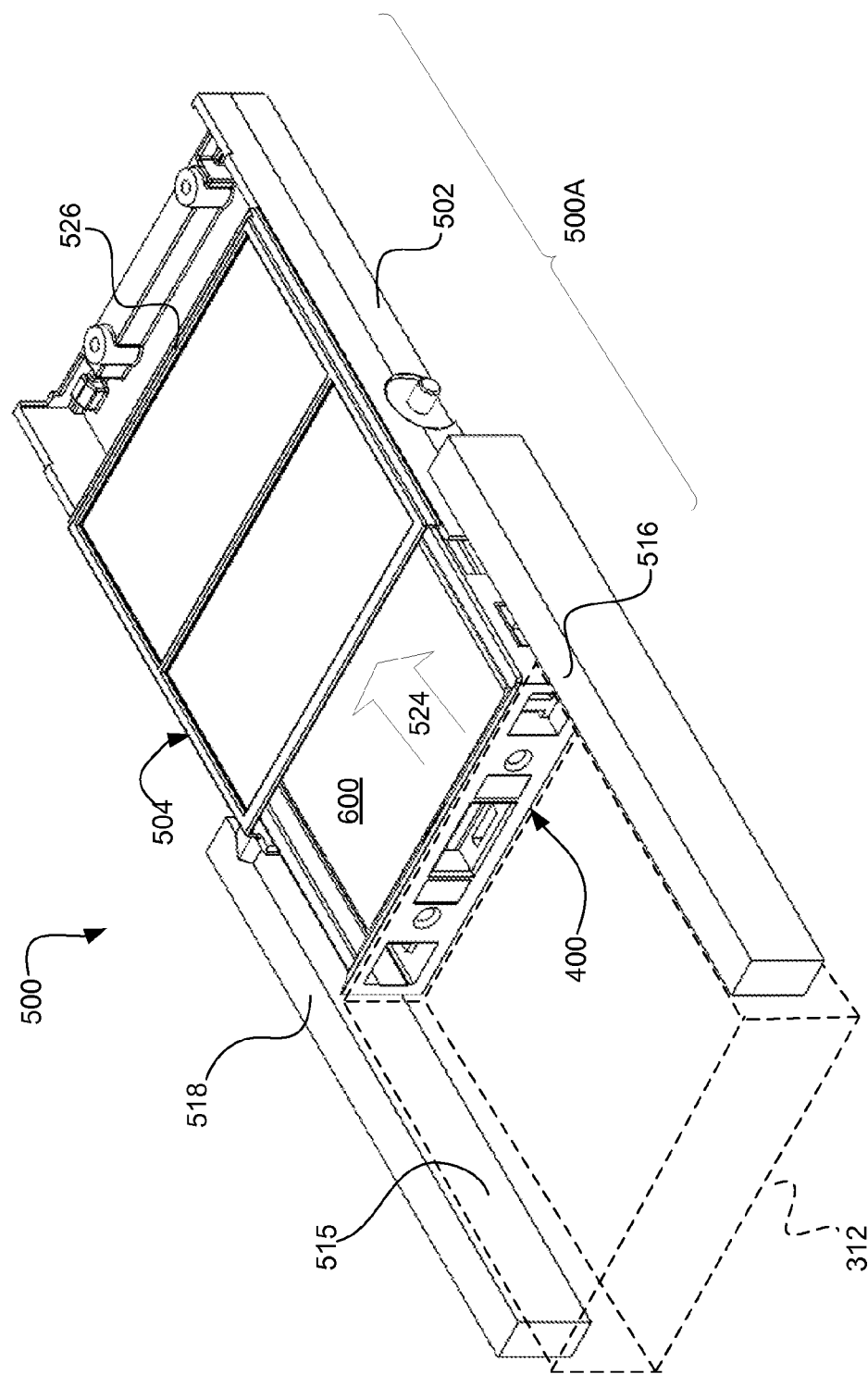
FIG. 13 is a perspective views of a transporter being inserted into a test slot while the test slot is engaged by actuators.

In the example of FIGS. 10A, 10B, 11, and 12, the engaging elements 506, 508, and 510 are kinematic pins that are configured to mate with recesses 512, 514 of actuators 516, 518, respectively. Both of the actuators 516, 518 are associated with the robot. For example, as shown in FIG. 13, the actuators 516, 518 are arranged on opposing sides of the manipulator 312 of the robot 300. As shown in FIGS. 11 and 12, the actuator 516 includes an inner surface 513 that is arranged to face the sidewall 502 of the test slot 500. The inner surface 513 includes the engaging element 512, which in this example is a recess configured to mate with the engaging element 506 (a kinematic pin) when the robot 300 engages the test slot 500. Similarly, the actuator 518 includes an inner surface 515 that includes engaging element 514, which in this example is a v-shaped recess configured to mate with engaging elements 508 and 510 when the robot 300 engages the test slot 500. The V-shaped groove and engaging elements 508 and 510 are shaped to form a kinematic connection.

FIG. 13 illustrates an example in which the robot 300 inserts the storage device transporter 400 (which contains storage device 600) into the test slot 500. The actuators 516, 518 are arranged on opposing sides of, and extend outward from, the manipulator 312 of the robot 300. Thus, as the robot 300 moves in the direction of the test slot 500, the actuators 516, 518 protrude in front of the manipulator 312 such that they may contact the test slot 500 before the transporter 400 is inserted into the test slot 500.

In some examples, after the robot 300 extends the manipulator 312 (and the attached actuators 516, 518) toward the test slot 500, the robot 300 may use cameras or other sensors to crudely align the manipulator 312 and actuators 516, 518 with the test slot 500. Once the actuators are in a position to engage the test slot 500 (e.g., by aligning the engaging element 506 with the recess 512 and by aligning the engaging elements 508, 510 with the recess 514), the actuators 516, 518 can "grab" the test slot 500 by causing the actuators 516, 518 to move in directions 520, 522, respectively. While in some examples, this force can be applied pneumatically, hydraulically, or mechanically, the dimensions of the actuators 516, 518 relative to the test slot 500 can be design such that the actuators 516, 518 simply "slip" over the engaging elements.

Once the engaging elements 506, 508, 510 have mated with the recesses 512, 514, an indication can be sent to the robot 300 that the robot 300 has successfully engaged the test slot 500. After this indication has been received, the manipulator 312 can begin to insert the transporter 400 into the test slot 500 by applying force to the transporter 400 in a direction 524. The manipulator 312 may continue to apply force to the transporter 400 until the transporter 400 or storage device 600 has successfully mated with one or more connectors (not shown) located near the distal end 526 of the test slot 500. Again, an indication can be sent to the robot 300 when the transporter and storage device have been successfully inserted into the test slot 500.

By gripping the test slot 500 prior to inserting the transporter 400 into the test slot 500, any impact of the transporter 400 or storage device 600 against a frame of the test slot 500 will not transmit vibration energy to the chassis 102. Instead, because the actuators 516, 518 are engaged with the test slot 500, any shock or vibration energy will be absorbed by the actuators 516, 518, the manipulator 312, and the robot 300. If the robot 300, the manipulator 312, and the actuators 516, 518 are mechanically isolated from the test rack 100, this energy will not be transferred to the test rack 100 or the other storage devices being tested therein.

Similar techniques can be used to remove the transporter 400 and/or the storage device 600 from the test slot 500. In that case, the robot 300 first engages the test slot 500 with the actuators 516, 518 to stabilize the test slot 500. Once the actuators 516, 518 have successfully engaged the test slot 500, the manipulator 312 can begin removing the transporter 400 and/or storage device 600 from the test slot 500 (e.g., the manipulator can being engaging the transporter 400, or can begin to remove a transporter 400 with which the manipulator 312 is already interfacing).

While in the examples above there are two actuators 516, 518, any number or type of actuators can be used.

While in the examples above the engagement elements 506, 508, and 510 are described as kinematic pins, other types of engagement elements can be used. For example the engaging elements may be self-aligning, kinematic, non self-aligning, non kinematic, or a combination thereof. Exemplary engagement elements may include pins, pegs, recesses, slots, holes, detents, grooves, friction elements, or magnets. In the case where the engagement elements use friction to engage the test slot, the engagement elements may include one or more friction pads, or one or more textured surfaces of the engagement elements. In some examples, the engagement elements may engage the test slot using a native friction associated with the engagement elements. Similarly, while the actuators 516, 518 have been described as including recesses 512, 514, any suitable engagement element can be used to correspond with the engagement elements of the test slot 500. Moreover, the test slot 500 and the actuators 516, 518 can include any number, shape, size, or type of engagement elements. The test slot can also be engaged in locations on the test slot in addition to or instead of the side walls of the test slot 500. For example, the test slot can be engaged at side and the front, the side and the top, the side and the bottom, the top and the bottom, or any combination thereof.

In some examples, the actuators 516, 518 can engage the test slot 500 after a portion of the storage device 600 or transporter 400 has already been inserted into or removed from the test slot 500. Stated differently, the robot 300 may not use the actuators 516, 518 to "grip" the test slot 500 until at least part of the insertion or removal action has been completed.

In some examples, automated machinery such as the robot 300 (FIG. 1) can be configured to transport storage devices (e.g., disk drives) without the need for a storage device transporter. For example, the robot (or other automated machinery) may directly contact a storage device in order to transport it to, and deposit it in, a test slot (e.g., test slot 500 (FIG. 4)), without requiring that the storage device be arranged within a storage device transporter.

A number of implementations have been described. Nevertheless, it will be understood that various modifications may be made without departing from the spirit and scope of the disclosure. For example, the protrusions on the test slots that interface with the isolators in the body could be embodied as protrusions on the body that interface with isolators on the test slots. Accordingly, other implementations are within the scope of the following claims.

What is claimed is:

1. A method comprising:
    using automated machinery to clamp a test slot to inhibit movement of the test slot relative to a chassis supporting the test slot, the inhibited movement being in the direction used to insert or remove a storage device from the test slot, thereby inhibiting transmission of vibration from the test slot to its surroundings; and
    while the automated machinery is engaged with the test slot, actuating the automated machinery to:
        insert a storage device into the test slot; or
        remove the storage device from the test slot.

2. The method of claim 1, wherein the automated machinery engages the test slot with one or more actuators.

3. The method of claim 2, wherein the one or more actuators comprise one or more first engaging elements.

4. The method of claim 3, wherein the test slot comprises one or more second engaging elements.

5. The method of claim 4, wherein clamping the test slot comprises:
    causing the one or more first engaging elements to temporarily connect to the one or more second engaging elements.

6. The method of claim 2, wherein the automated machinery comprises a robot that comprises a manipulator for carrying the storage device.

7. The method of claim 6, wherein the actuators are coupled to the robot and/or the manipulator.

8. The method of claim 3, wherein the one or more first engaging elements comprise an element selected from a group consisting of:
    a pin, a recess, a slot, a magnet, an adhesive, a clasp, and a hook.

9. The method of claim 3, wherein the one or more of the first engaging elements are adapted to engage the test slot by friction.

10. The method of claim 4, wherein the one or more second engaging elements comprise an element selected from a group consisting of:
    a pin, a recess, a slot, a magnet, an adhesive, a clasp, and a hook.

11. The method of claim 1, wherein the storage device is carried by a storage device transporter.

12. The method of claim 11, wherein the automated machinery comprises a robot and a manipulator for engaging the storage device transporter; and
    wherein the actuators are coupled to the robot and/or the manipulator.

13. An apparatus comprising:
    at least one engaging element configured to clamp a test slot to inhibit movement of the test slot relative to a chassis supporting the test slot, the inhibited movement being in the direction used to insert or remove a storage device from the test slot, thereby inhibiting transmission of vibration from the test slot to its surroundings; and an automated transporter configured to engage the at least one engaging element and, while the at least one engaging element is engaged with the test slot, configured to:
insert a storage device into the test slot; or
remove the storage device from the test slot;
wherein the automated transporter comprises a robot that comprises a manipulator for carrying the storage device; and
wherein the at least one engaging element is coupled to the robot and/or the manipulator.

14. The apparatus of claim 13, wherein the at least one engaging element is configured to temporarily connect to one or more second engaging elements of the test slot.

15. The apparatus of claim 14, wherein the one or more second engaging elements comprise an element selected from a group consisting of:
a pin, a recess, a slot, a magnet, an adhesive, a clasp, and a hook.

16. The apparatus of claim 13, wherein the at least one engaging element comprises an element selected from a group consisting of:
a pin, a recess, a slot, a magnet, an adhesive, a clasp, and a hook.

17. The apparatus of claim 13, wherein the at least one engaging element is adapted to engage the test slot by friction.

18. The apparatus of claim 13 wherein the storage device is carried by the automated transporter.

* * * * *